US007949653B2

(12) United States Patent
Tanaka et al.

(10) Patent No.: US 7,949,653 B2
(45) Date of Patent: May 24, 2011

(54) STREAM DATA PROCESSING METHOD AND STREAM DATA PROCESSING SYSTEM

(75) Inventors: Michiko Tanaka, Kokubunji (JP); Itaru Nishizawa, Koganei (JP); Toshihiko Kashiyama, Kokubunji (JP); Tsuneyuki Imaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 382 days.

(21) Appl. No.: 12/035,094

(22) Filed: Feb. 21, 2008

(65) Prior Publication Data

US 2009/0006310 A1 Jan. 1, 2009

(30) Foreign Application Priority Data

Jun. 27, 2007 (JP) ................................. 2007-169228

(51) Int. Cl.
*G06F 17/30* (2006.01)
*G06F 7/00* (2006.01)
(52) U.S. Cl. ......... 707/715; 707/711; 707/746; 707/769
(58) Field of Classification Search ........................ None
See application file for complete search history.

(56) References Cited

U.S. PATENT DOCUMENTS

2006/0277230 A1   12/2006   Nishizawa et al.
2007/0022092 A1   1/2007    Nishizawa et al.
2007/0214163 A1*  9/2007    Luo et al. ...................... 707/101

OTHER PUBLICATIONS

"Query Processing, Resource Management, and Approximion in Data Stream Management System" by Rajeev Motwani, et al., 2003.
"Trio-One: Layering Uncertainty and Lineage on a Conventional DBMS" by Michi Mutsuzaki, et al. Jan 7-10, 2007.

* cited by examiner

*Primary Examiner* — Greta L Robinson
*Assistant Examiner* — James J Wilcox
(74) *Attorney, Agent, or Firm* — Mattingly & Malur, PC

(57) ABSTRACT

In order to make real time and the avoidance of risk compatible according to the contents of processing by an application, an index ID applying module applies an index computed utilizing streams before and after stream data to the stream data, computes the index again according to a stream that varies every moment, applies an index computed based upon the index of the stream data to the result of the processing of the stream data according to a predetermined procedure and outputs it. An application that receives the result of the processing and the index of the result of the processing switches processing depending upon the index.

9 Claims, 19 Drawing Sheets

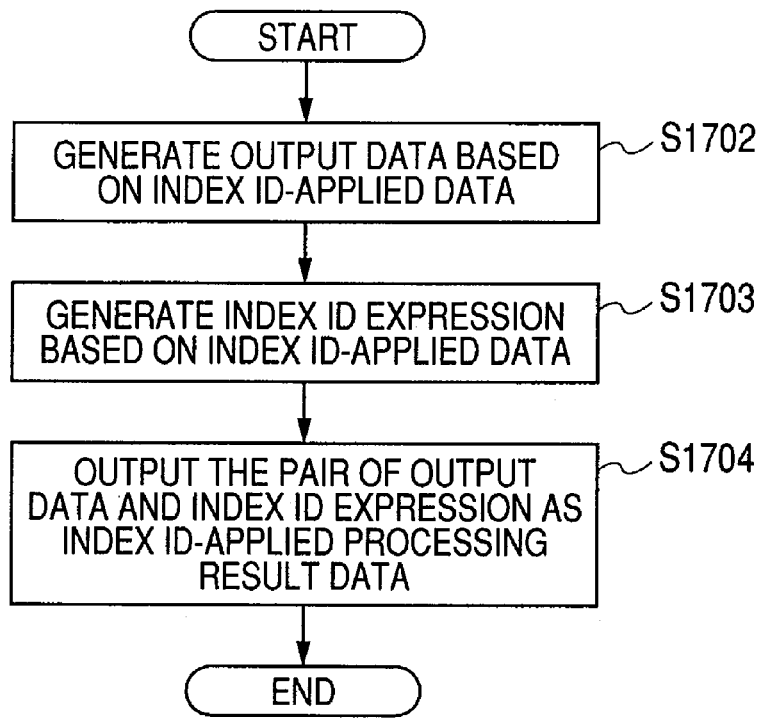
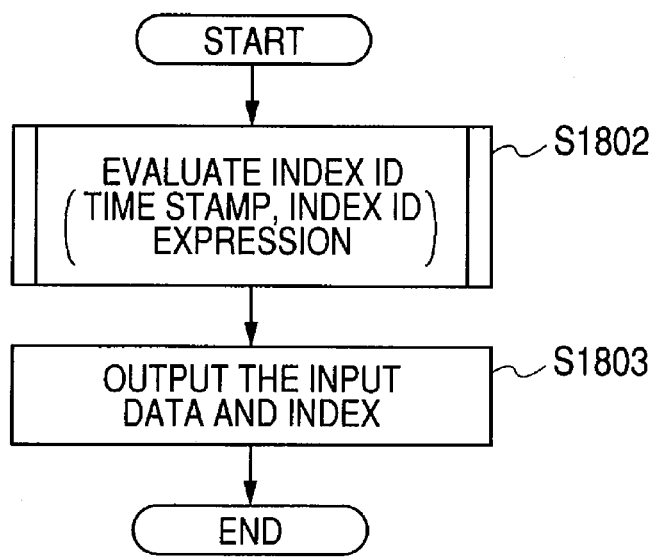

FIG. 14

```
If d_{i-1}≠null and d_i≠null and d_{i+1}≠null
    then if d_{i-1}=d_i=d_{i+1}
      then P_{it}=1.0
      else if d_{i-1}≠d_{i+1}
        then P_{it}=0.7
        else P_{it}=0.3
  else if d_{i-1}≠null and d_i≠null and d_{i+1}=null
    then if d_{i-1}=d_i
      then P_{it}=1.0
      else P_{it}=0.5
    else if d_{i-1}=null and d_i≠null and d_{i+1}≠null
      then P_{it}=P_{i(t-1)}
      else if d_{i-1}=null and d_i≠null and d_{i+1}=null
        then P_{it}=0.5
        else error
```

FIG. 15

| 501 | 502 | 503 | 504 |
|---|---|---|---|
| 10:00'01 | PRODUCT 1 | INSIDE SHELF | p1 |
| 10:00'02 | PRODUCT 1 | INSIDE SHELF | p2 |
| 10:00'03 | PRODUCT 1 | OUTSIDE SHELF | p3 |

FIG. 16

| | | | | | | | | |
|---|---|---|---|---|---|---|---|---|
| p1 | 0 | ... | 10:00'2 | 1.0 | 10:00'3 | 1.0 | ... | 10:00'4 |
| p2 | 1 | ... | 10:00'2 | 1.0 | 10:00'3 | 1.0 | ... | |
| p3 | 2 | ... | 10:00'3 | 0.5 | | | ... | |

FIG. 17

| 10:00'03 | PRODUCT 1 | OUTSIDE SHELF | p3 | ~701 |
|---|---|---|---|---|

| 10:00'02 | PRODUCT 1 | INSIDE SHELF | p2 | ~702 |
|---|---|---|---|---|
| 10:00'03 | PRODUCT 1 | OUTSIDE SHELF | p3 | ~703 |

FIG. 25

```
SELECT S.roomID
FROM S[now]
WHERE S. temperature > 40
GROUP BY roomID
```

FIG. 26

```
IF RELIABILITY OF OUTPUT DATA IS 0.5,
  THEN NOTIFY SECURITY GUARD

ELSE IF RELIABILITY OF OUTPUT IS 0.9,
  THEN ACTIVATE SPRINCLER
```

STREAM DATA PROCESSING METHOD AND STREAM DATA PROCESSING SYSTEM

CLAIM OF PRIORITY

The present application claims priority from Japanese application JP 2007-169228 filed on Jun. 27, 2007, the content of which is hereby incorporated by reference into this application.

FIELD OF THE INVENTION

The present invention relates to stream data processing technique, and particularly relates to technique effective in adding reliability to the result of the processing of stream data in a radio frequency identification (RFID) reader and a sensor.

BACKGROUND OF THE INVENTION

In comparison with a database management system (hereinafter called DBMS) which executes a processing for data store in a storage system, there is an increasing demand for a data processing system which performs real-time processing, in case where the object to be processed is data arriving from moment to moment.

For example, as for a store, it is an important subject to utilize a smart shelf system which is a system for grasping the stock of the store in real time by exhibiting products to which each RFID tag is added on a product exhibit shelf on which an RFID reader is installed and continuously reading the RFID tag by the RFID reader and to make good use of a situation of the stock that varies every moment for sales promotion.

For such a data processing system which defines data transmitted every moment as stream data and is suitable for the real time processing of the stream data, a stream data processing system is proposed and for this type of stream data processing system, a stream data processing system STREAM is known (for example, refer to "Query Processing, Resource Management, and Approximation in a Data Stream Management System" written by R. Motwani, J. Widom, 22rasu, 21abcock, S. Babu, M. Datar, G. Manku, C. Olston, J. Rosenstein, and R. Varma in Proc. of the 2003 Conf. on Innovative Data Systems Research (CIDR), January (a non-patent document 1)).

For example, real time store stock management can be realized as follows by utilizing the stream data processing system in the smart shelf system. The stream data processing system continuously receives store stock information that varies every moment from the smart shelf system.

The stream data processing system detects an event that a product is taken out of a shelf by a customer by comparing a store stock situation at each time at which a store stock situation is received and a store stock situation at the preceding time.

A terminal for displaying product information such as a display is installed in a position adjacent to a shelf and visible to a customer and when the stream data processing system detects that a product is taken out of the shelf, it displays the explanation of the taken product and its related information. The purchase by the customer of the product can be promoted by displaying when the customer takes the product out of the shelf.

As described above, the stream data processing system is suitable for a real time application that utilizes the result of the real time processing of successively input stream data such as data from the RFID reader and the sensor and financial information including a stock price trend.

Besides, a demand for processing a data set including data not necessarily correct such as data output from the RFID reader and the sensor, data including noise as a result of the failure of reading and a measurement error and web data registered by the public increases.

For this type of processing system, a system TRIO that handles the reliability of data in a relational database (RDB) is known (for example, refer to "Trio-One: Layering Uncertainty and Lineage on Conventional DBMS" written by M. Mutsuzaki, M. Theobald, A. de Keijzer, J. Widom, P. Agrawal, O. Benjelioun, A Das Sarma, R. Murthy, and T. Sugihara in Proceedings of the Third Biennial Conference on Innovative Data Systems Research (CIDR07), January, 2007 (a non-patent document 2)).

For example, for the eyewitness report of a traffic accident, information such as reliability that a car which caused an accident is A is 0.6 and reliability that the car is B is 0.4 and information such as reliability that a driver of the car A is "a" is 0.3 and reliability that the driver is "b" is 0.7 are stored in the database.

Candidates to which reliability is added of the driver who caused the accident can be acquired by matching the eyewitness report of the car which caused the accident and the eyewitness report of the driver with the database storing such information.

As described above, in the TRIO system, reliability-added data is queried and the reliability-added result of the processing can be acquired.

For a processing system when no sensor data exists at predetermined time, a system that computes the reliability at that time of sensor data at another time and outputs the sensor data and the reliability is known (for example, refer to JP-A No. 2006-268369).

Even if no sensor data exists at predetermined time when a request for the output of sensor data at the predetermined time is made from external equipment, the reliability at the predetermined time of sensor data at another time is computed, and the computed reliability and the sensor data at another time are output. Hereby, the sensor data processing side can handle the sensor data like synchronous data by referring to the reliability.

SUMMARY OF THE INVENTION

However, it was found by these inventors that the above-mentioned stream data processing technique had the following problems.

That is, the technique disclosed in the non-patent document 1 has a problem that an error is propagated in the result of the processing of data including an error such as noise in environment where the data including an error such as noise is continuously transmitted and it cannot be judged whether the result of the processing is erroneous or not.

Besides, in the technique disclosed in the non-patent document 2, data the reliability of which varies in real time cannot be efficiently processed. In the meantime, in the technique disclosed in JP-A No. 2006-268369, as reliability cannot be added to input data, the sufficient solution of reducing a risk by processing based upon error data at the same time as the real time processing of input data is not disclosed.

For example, read noise is included in data output from the RFID reader and the sensor. Noise is also included in the result of processing based upon the input data. An application that receives the output cannot judge whether the received data is noise or not and erroneous processing may be caused.

The smart shelf system will be described as an example below.

The smart shelf system is configured by a product exhibition shelf, an RFID reader and an RFID tag. The RFID reader is installed on the product exhibition shelf and the RFID tag is added to a product exhibited on the product exhibition shelf.

The RFID reader reads RFID tags at a fixed cycle such as every second and determines that a product to which a readable RFID tag is added exists on the shelf and a product to which an unreadable RFID tag is added is taken out of the shelf by a customer.

Depending upon an RFID tag and a characteristic of the RFID reader, the RFID reader may fail to read the RFID tag for a moment. This phenomenon is called fluctuation. The RFID reader may read an RFID tag to be read by an adjacent RFID reader for a moment. Though a product is actually not taken, the product may be regarded as taken out by this phenomenon.

When a frequency at which a product is picked up by a customer is totalized based upon RFID tag information read by the RFID reader and analysis such as extracting correlation between the picked-up product and a well-sold product is made, a problem that a product to which an RFID tag where fluctuation is easily caused is added is judged to be picked up plural times though the customer does not actually pick it up and the result of erroneous analysis is output occurs.

To avoid the above-mentioned totalization and analysis which do not conform to an actual situation, when data input from the RFID reader and the sensor is processed, a method of considering the reliability of the data is conceivable.

The reliability of time series data output from the RFID reader and the sensor can be evaluated in consideration of a characteristic of a measured object. For example, in the above-mentioned example of the smart shelf system, it is hardly conceivable that a customer takes a product out of the product exhibition shelf only for one second and afterward, soon returns it to the product exhibition shelf.

Therefore, it is conceivable that in time series data in which the result of the read of an RFID tag by the RFID reader is output, a product has a characteristic that the position is unchanged for a certain extent of long time (for example, for three seconds).

As a possibility that data telling that the position is changed only for one second is caused by fluctuation is judged to be high based upon such a characteristic, reliability that a product is taken out of the shelf by a customer is set to a small value.

As described above, generally, to acquire the reliability of time series data, data before and after the time series data are required to be used for determination. That is, generally, to acquire the reliability of time series data, the succeeding data is required to be awaited.

In the meantime, when the result of processing is output after the reliability is acquired after fixed time (for example, 5 seconds) elapses, processing to be executed at real time is disabled.

For example, in the example of the smart shelf system, customer service that product information is displayed on a display installed on the smart shelf in a moment in which a customer takes a product out of the shelf is important in expanding a sales chance.

It is important to provide this service in the moment in which the product is taken out and in the display after the fixed time, large effect in expanding a sales change cannot be desired. In the meantime, even if product information is displayed because of fluctuation though a product is actually not taken out of the shelf by a customer, its effect is small.

When the stream data processing technique disclosed in the non-patent document 1 and the reliability-added data processing technique disclosed in the non-patent document 2 are combined, data acquired by adding reliability generated based upon the reliability of input reliability-added stream data to stream data to which processing such as totalization is applied can be output, however, as fixed time is required to be awaited to acquire the reliability of the stream data, a problem that real time cannot be secured occurs.

As described above, the security of real time and the avoidance of an error risk of the result of processing by noise are related as the relation of a trade-off.

An object of the invention is to provide technique that enables the compatibility of real time and the avoidance of a risk and reliable stream data processing according to the contents of processing by an application.

The above-mentioned and another objects and new characteristics of the invention will be clarified by the description of this specification and the attached drawings below.

The brief description of a representative outline of the invention disclosed in this application is as follows.

The invention is based upon a stream data processing system that processes a stream which is a flow of time series data including time stamps-applied plural data continuously incoming in the ascending order of the time stamps according to an arbitrarily registered query, and a stream data processing system according to the invention applies an index to be a first index computed based upon index function algorithm to stream data utilizing a stream in arbitrary time and applies an index to be a second index acquired based upon the index of the first index to the result of the processing of the stream data to which the first index is applied.

Besides, an outline of another invention in this application will be briefly described below.

The invention is based upon a stream data processing system that processes a stream which is a flow of time series data including time stamps-applied plural data tuples incoming in the ascending order of the time stamps according to an arbitrarily registered query, and a stream data processing system according to the invention is provided with an index ID applying module that computes an index of input stream data as a first index, acquires index ID and outputs the stream data to which the index ID is applied and computes the index at arbitrary time again, an index storing module that stores a set of the acquired index ID, the computed index and time at which the index is computed or a set of the index ID, the recomputed index and time at which the index is recomputed, a processing data management module that manages stream data to which index ID to be a processing object is applied according to a registered query, an index ID-applied data processing module that applies processing to stream data to which index ID to be the processing object is applied at each time and outputs an index ID expression showing the result of the processing and described utilizing the result of the processing and the index ID and an indexed data output module that acquires an index as the result of the processing based upon the index ID expression and the index stored in the index storing module and outputs it together with the result of the processing.

Besides, the invention is based upon a stream data processing system that processes a stream which is a flow of time series data including time stamps-applied plural data tuples incoming in the ascending order of the time stamps according to an arbitrarily registered query, and a stream data processing system according to the invention is provided with an index applying module that computes an index to be a first index of input stream data, outputs the stream data to which the index is applied, computes the first index at arbitrary time again and outputs the stream data to which the first index is applied, a processing data management module that manages stream data to which index ID to be a processing object is applied according to an arbitrarily registered query and an indexed data processing module that applies processing to stream data to which the first index to be a processing object is applied at each time and outputs the result of the processing and an index to be a second index.

Further, an outline of the other invention in this application will be briefly described below.

In a stream data processing method in which a first index that is a result of computing utilizing a stream in a limited range according to a predefined computation expression is applied to stream data and a second index acquired based upon index values of the first index is applied to a result of processing the indexed stream data, the index is equivalent to reliability which is probability showing the validity of stream data. The index may be also similarity to model time series data, probability judged to be a value off time series data before and after the corresponding time series data and probability judged to be a change point based upon the time series data before and after the corresponding time series data except the reliability.

As for the index of the result of the processing, as a stream varies every moment, the index of the stream data is computed again when a successive time stamp-applied stream data tuple is incoming or at an arbitrary time interval and an index of the result of processing is computed based upon the recomputed index of stream data.

An index of stream data is computed utilizing streams in a limited range before and after stream data according to a predefined computation expression.

The brief description of effect acquired by the representative embodiments of the invention disclosed in this application is as follows.

Control over execution that realizes an optimum trade-off between real time and reliability in stream data processing is enabled, and the security of real time and the avoidance of an error risk of the result of processing by noise can be compatible.

BRIEF DESCRIPTION OF THE DRAWINGS

FIG. 6 is a flowchart showing an example of processing by an index ID-applied data processing module provided to the stream data processing system;

FIG. 7 is a flowchart showing an example of processing by an indexed data generating module and an index ID evaluating module respectively provided to the stream data processing system;

FIG. 14 is an illustration showing one example of an indexing method of input stream data;

FIG. 15 is an illustration showing index ID-applied stream data generated by an index ID-applied data generating module provided to the stream data processing system shown in FIG. 1;

FIG. 16 is an illustration showing data stored in an index store table provided to the stream data processing system shown in FIG. 1;

FIG. 17 is an illustration showing an example of index ID-applied data output from the processing data management module;

FIG. 25 is an illustration showing an example of a query about the input stream data shown in FIG. 24;

FIG. 26 is an illustration showing one example of an application that receives the result of the query shown in FIG. 25 and its reliability and executes processing.

DETAILED DESCRIPTION OF THE PREFERRED EMBODIMENTS

Figure 1:
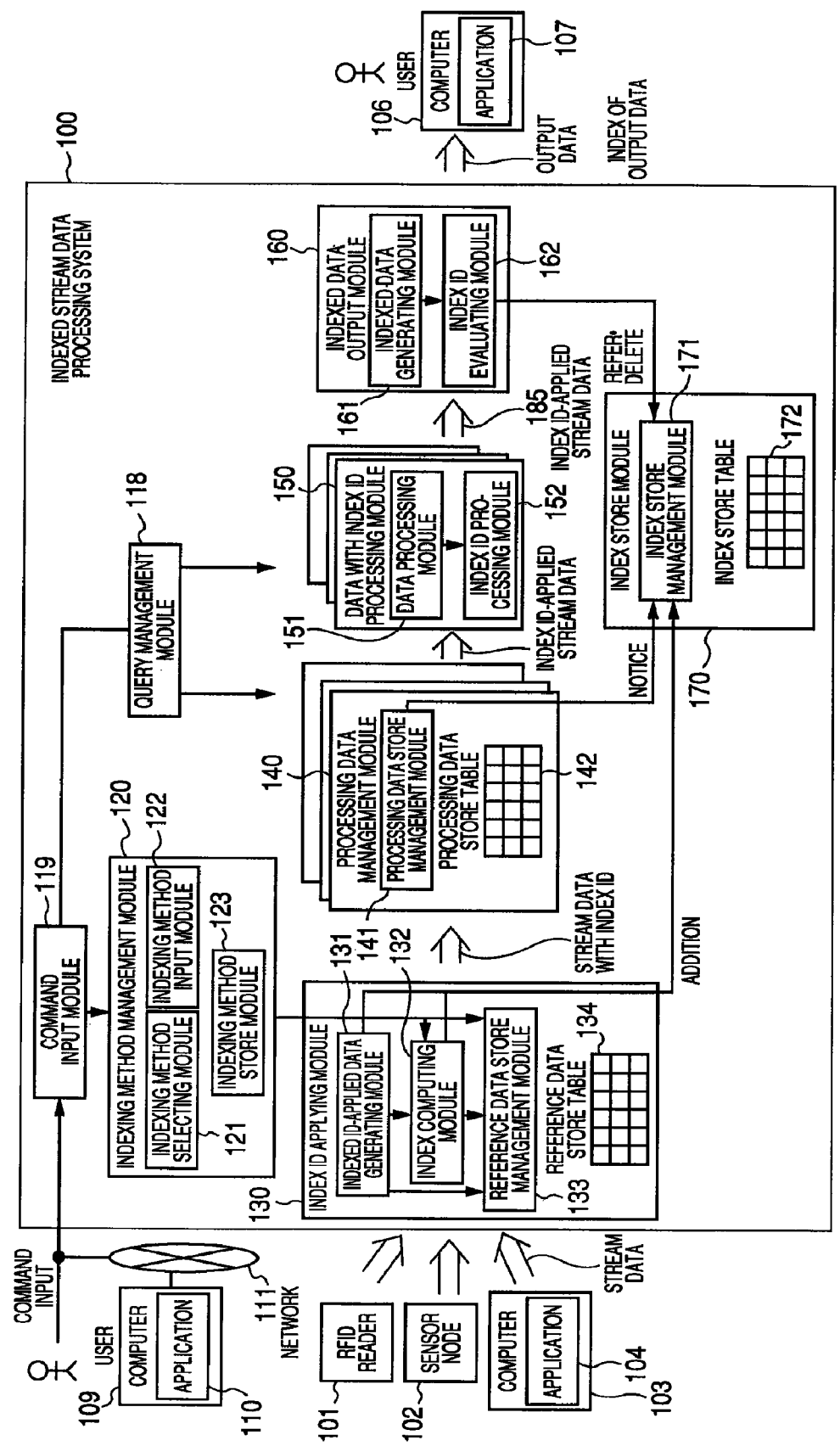
FIG. 1 is a block diagram showing an example of the configuration of a stream data processing system equivalent to a first embodiment of the invention.

Referring to the drawings, embodiments of the invention will be described in detail below. In all the drawings for illustrating the embodiments, the same reference numeral is allocated to the same member in principle and its repetitive description is omitted.

First Embodiment

Figure 2:
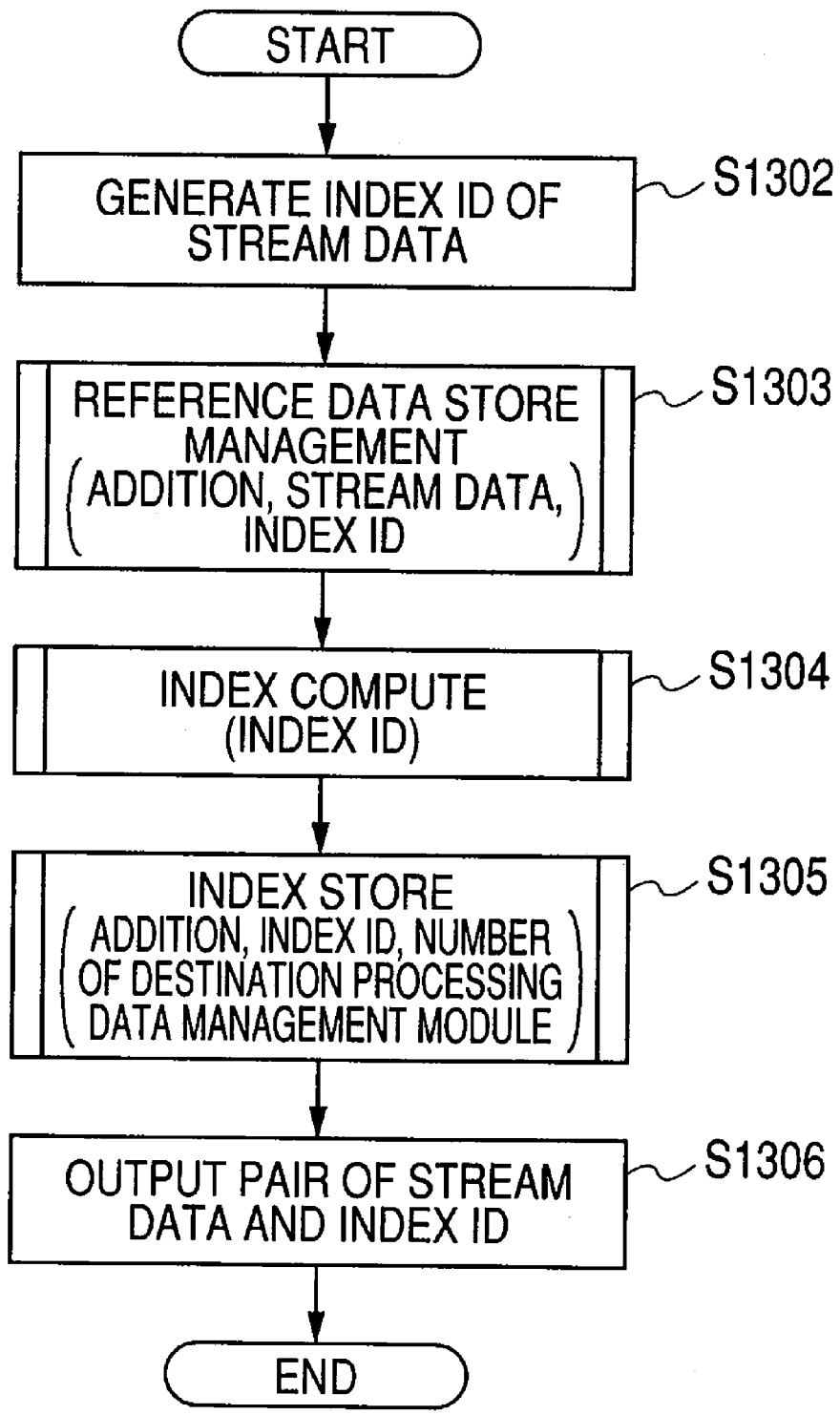
FIG. 2 is a flowchart showing an example of processing by an index ID applying module provided to the stream data processing system shown in FIG. 1.
Figure 3:
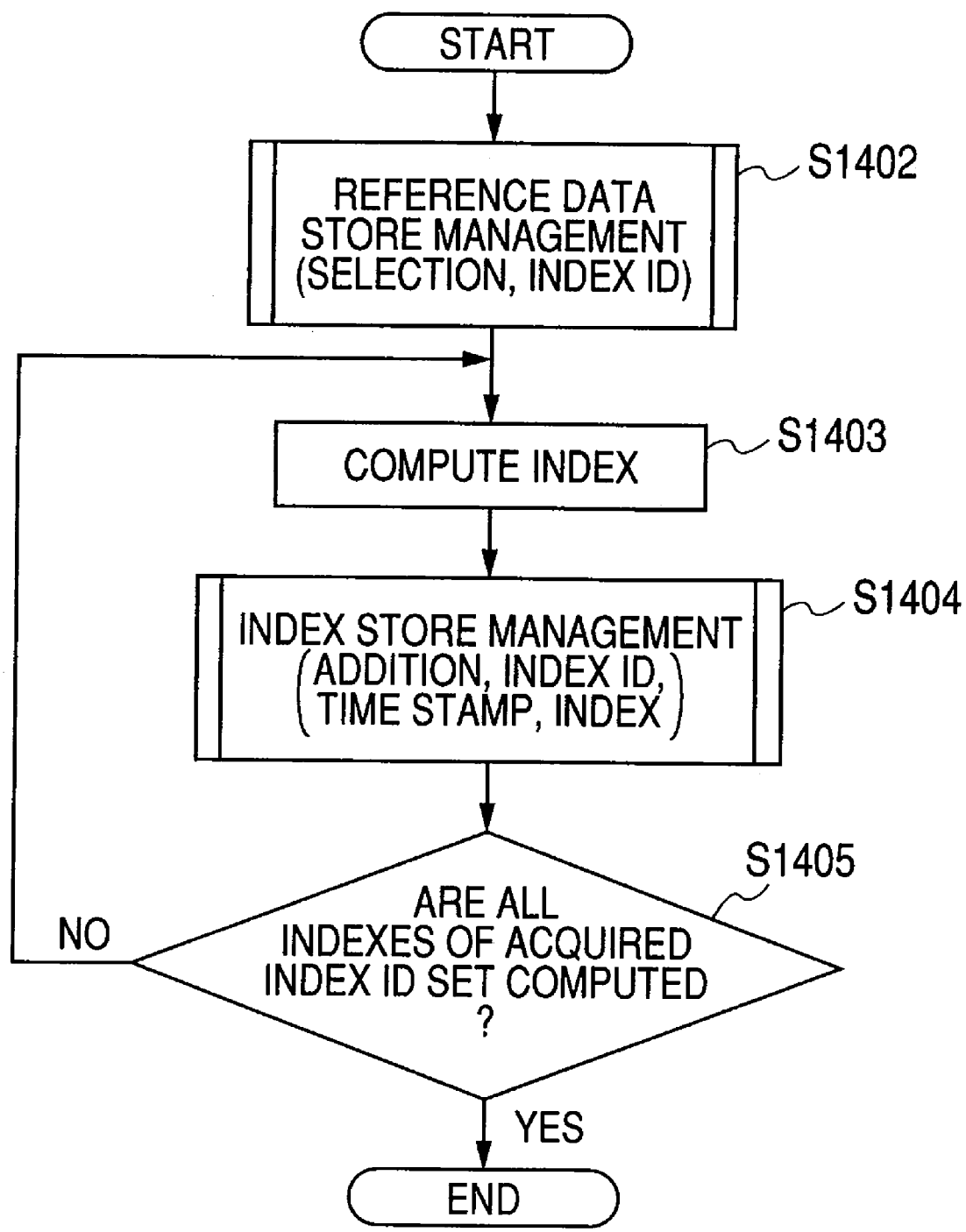
FIG. 3 is a flowchart showing an example of processing following the processing shown in FIG. 2 by the index ID applying module.
Figure 4:
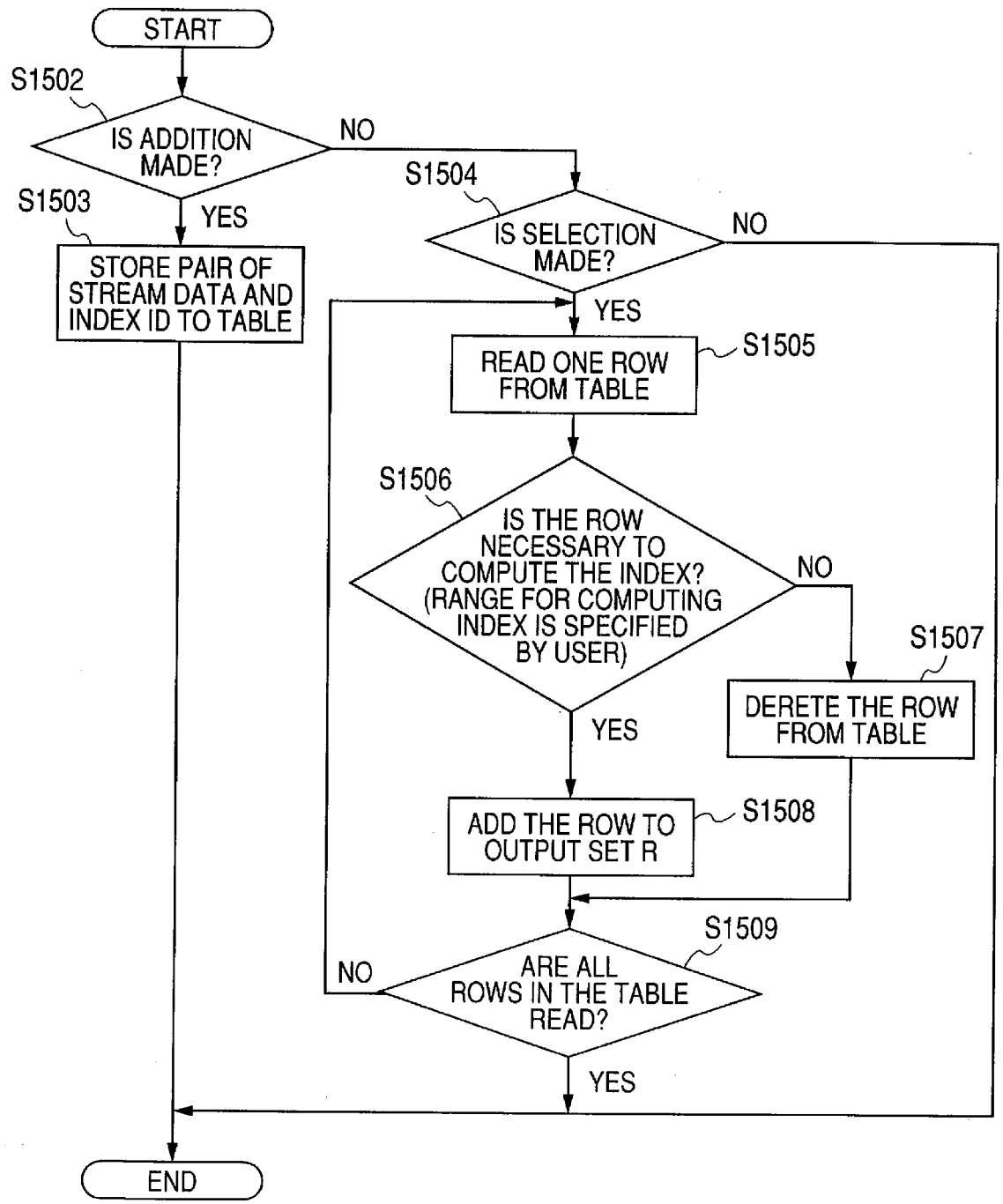
FIG. 4 is a flowchart showing an example of processing following the processing shown in FIG. 3 by the index ID applying module.
Figure 5:
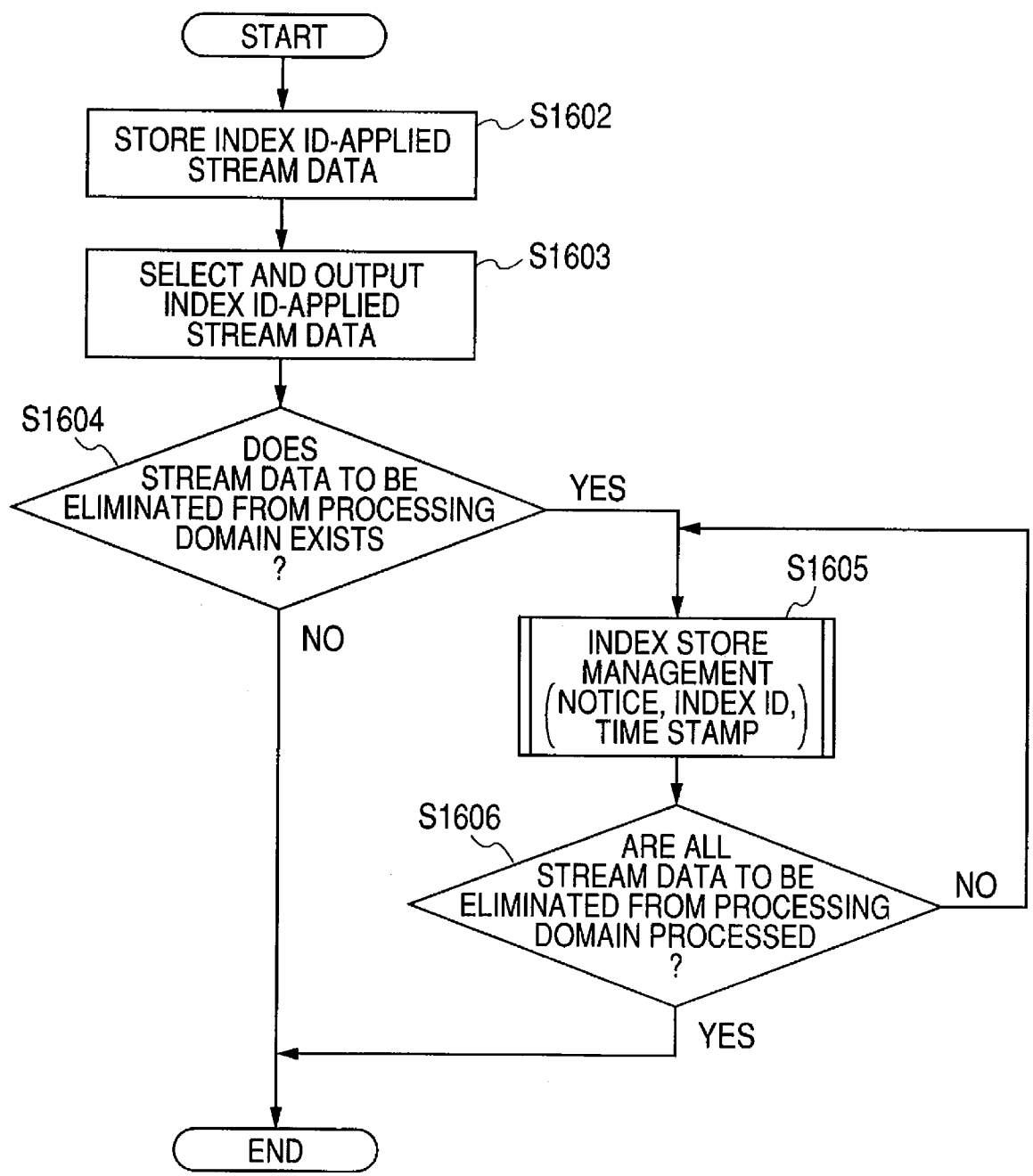
FIG. 5 is a flowchart showing an example of processing by a processing data management module provided to the stream data processing system.
Figure 8:
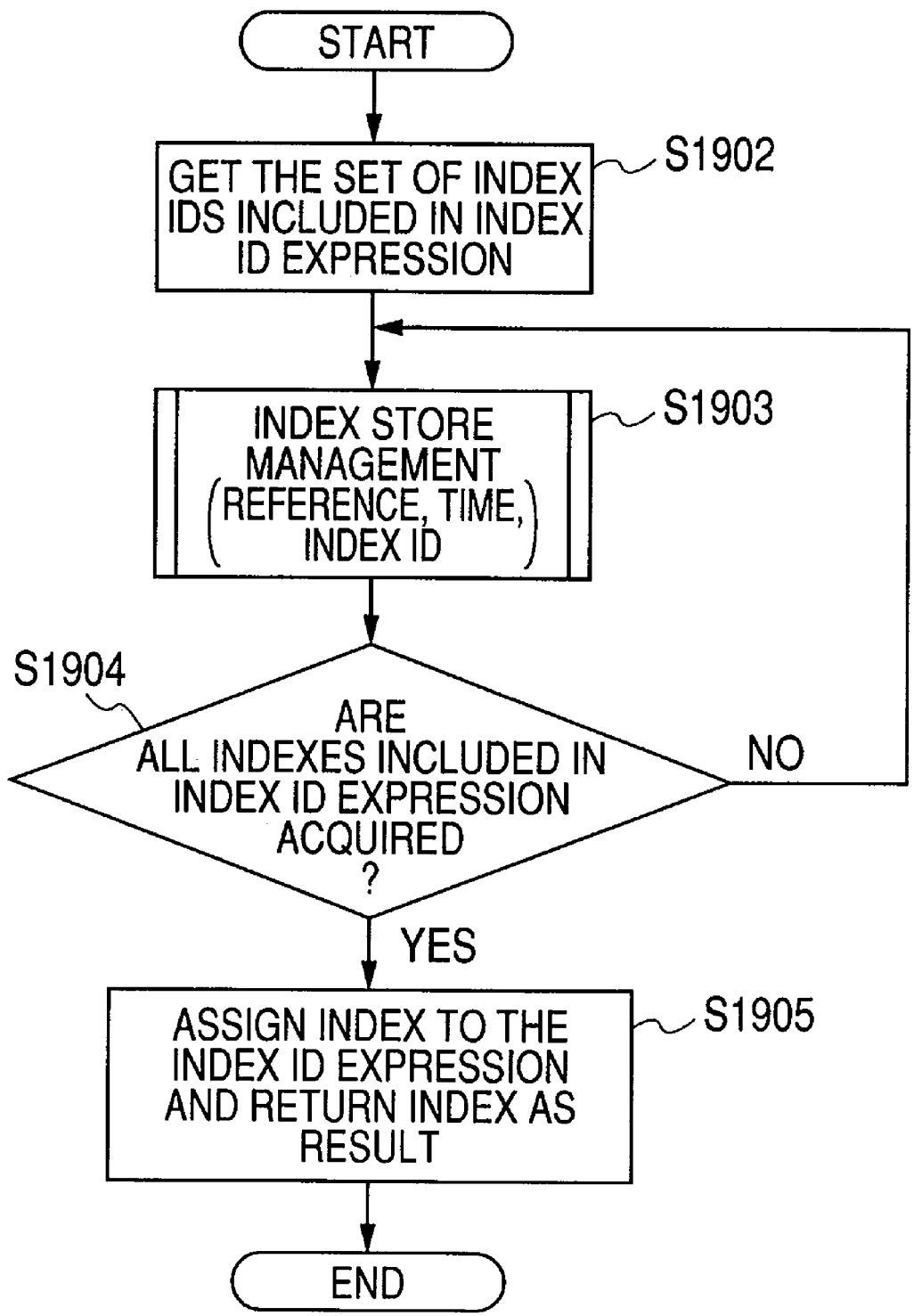
FIG. 8 is a flowchart showing an example of processing following the processing shown in FIG. 7 by the indexed data generating module and the index ID evaluating module.
Figure 9:
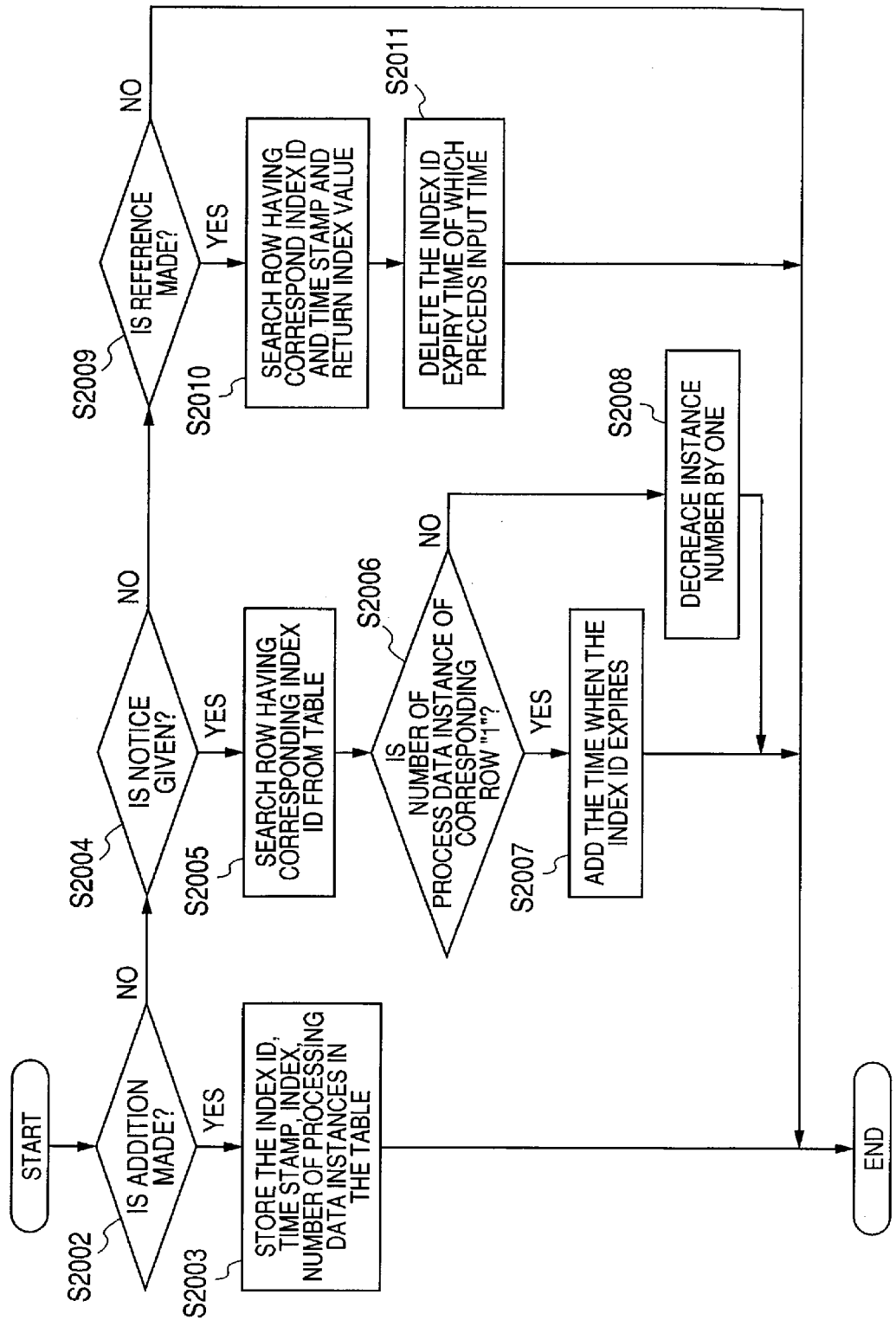
FIG. 9 is a flowchart showing an example of processing by an index store module provided to the stream data processing system.
Figure 10:
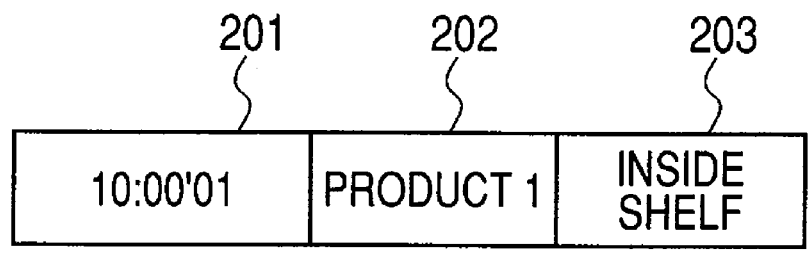
FIG. 10 is an illustration schematically showing one example of a data format of stream data used for the stream data processing system shown in FIG. 1.
Figure 11:
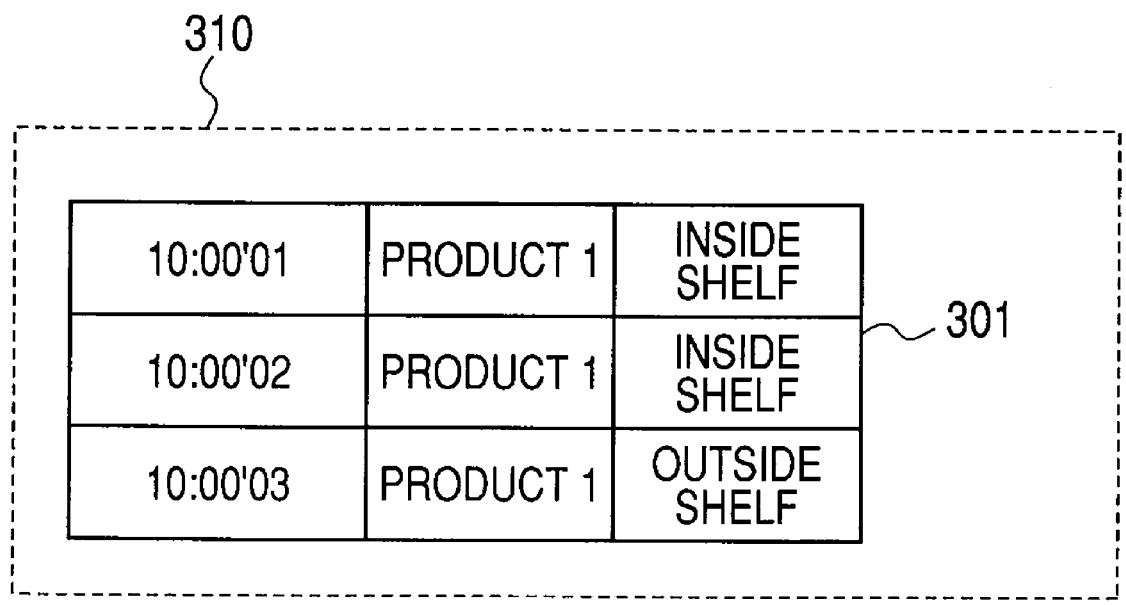
FIG. 11 is an illustration showing a product position measurement stream including continuously input stream data.
Figure 12:
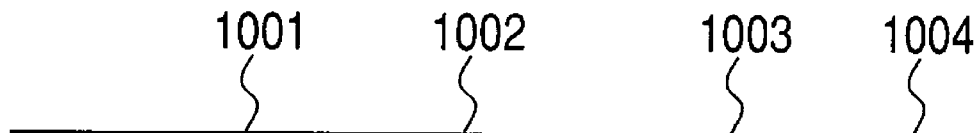
FIG. 12 is an illustration schematically showing an example of data stored by a reference data store management module provided to the stream data processing system shown in FIG. 1.
Figure 13:
FIG. 13 is an illustration showing one example of a query command about stream data.
Figure 18:
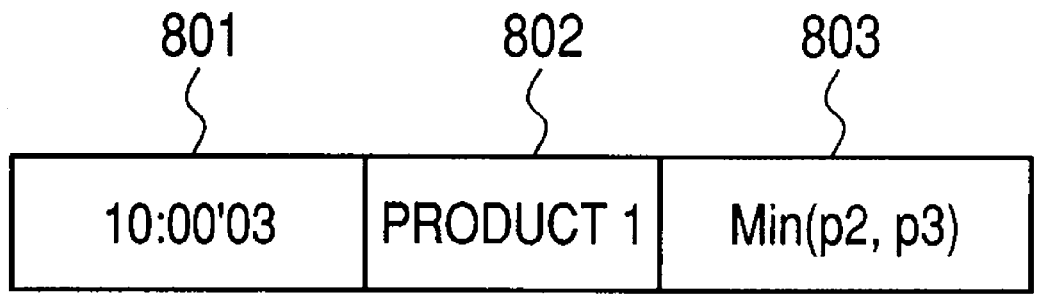
FIG. 18 is an illustration showing an example of index ID expression-applied processing result data output from the index ID-applied data processing module.
Figure 19:
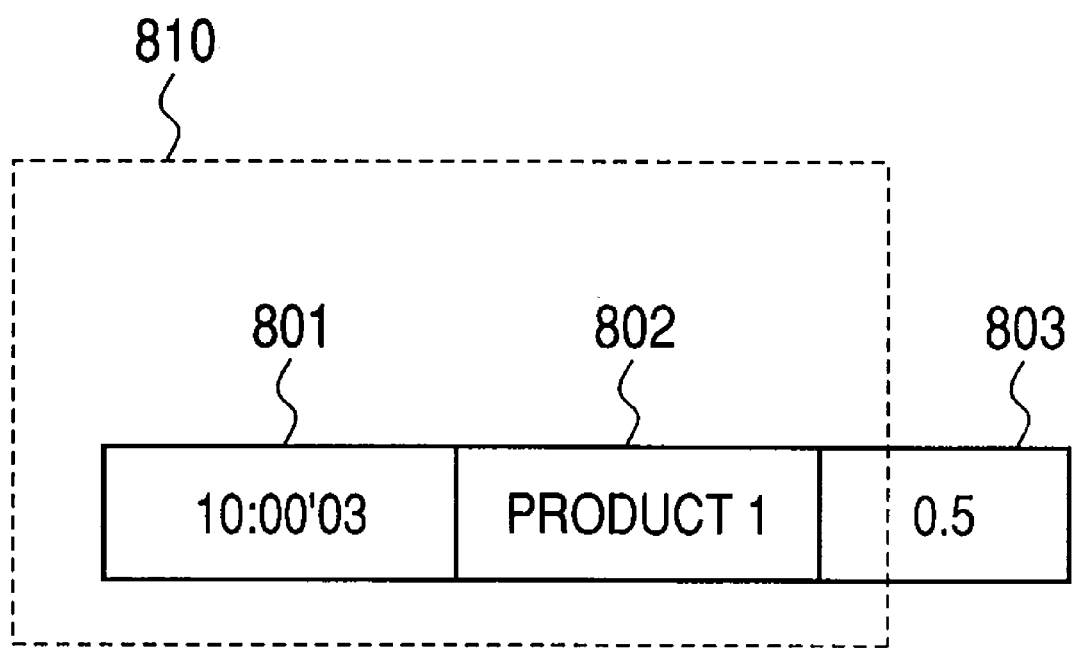
FIG. 19 is an illustration showing an example of data output from an indexed data output module provided to the stream data processing system shown in FIG. 1 and an example of an index of the output data.
Figure 20:
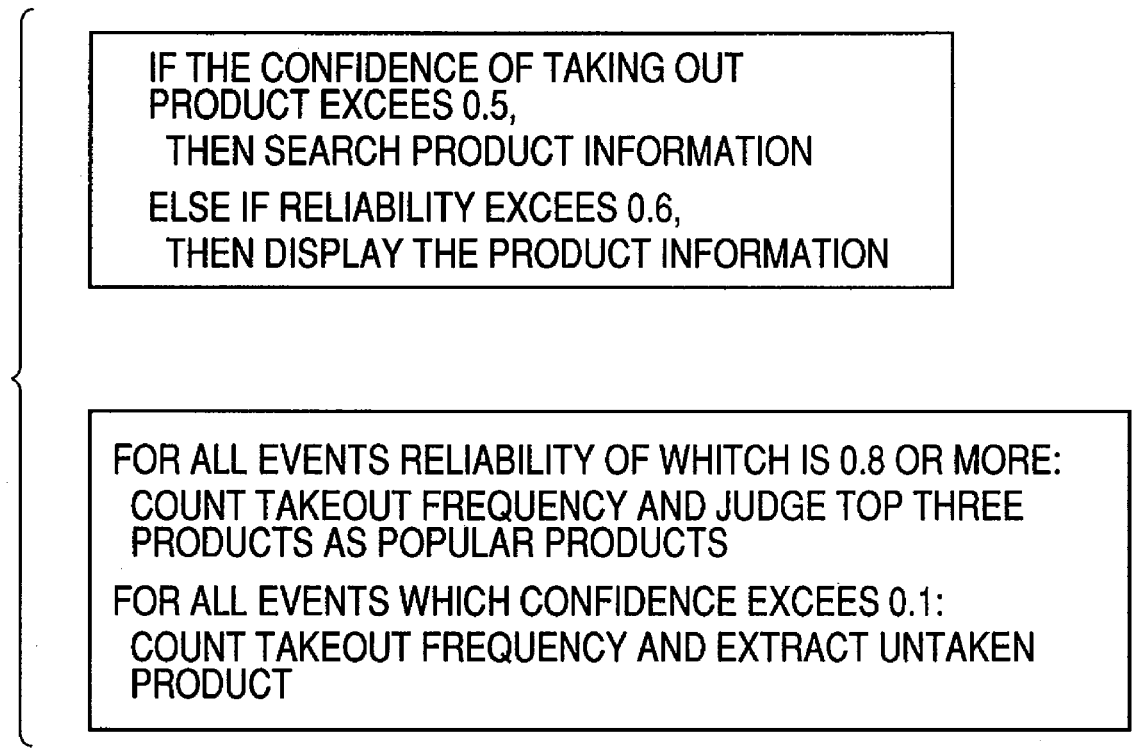
FIG. 20 is an illustration showing one example of processing by an application executed in a computer.
Figure 27:
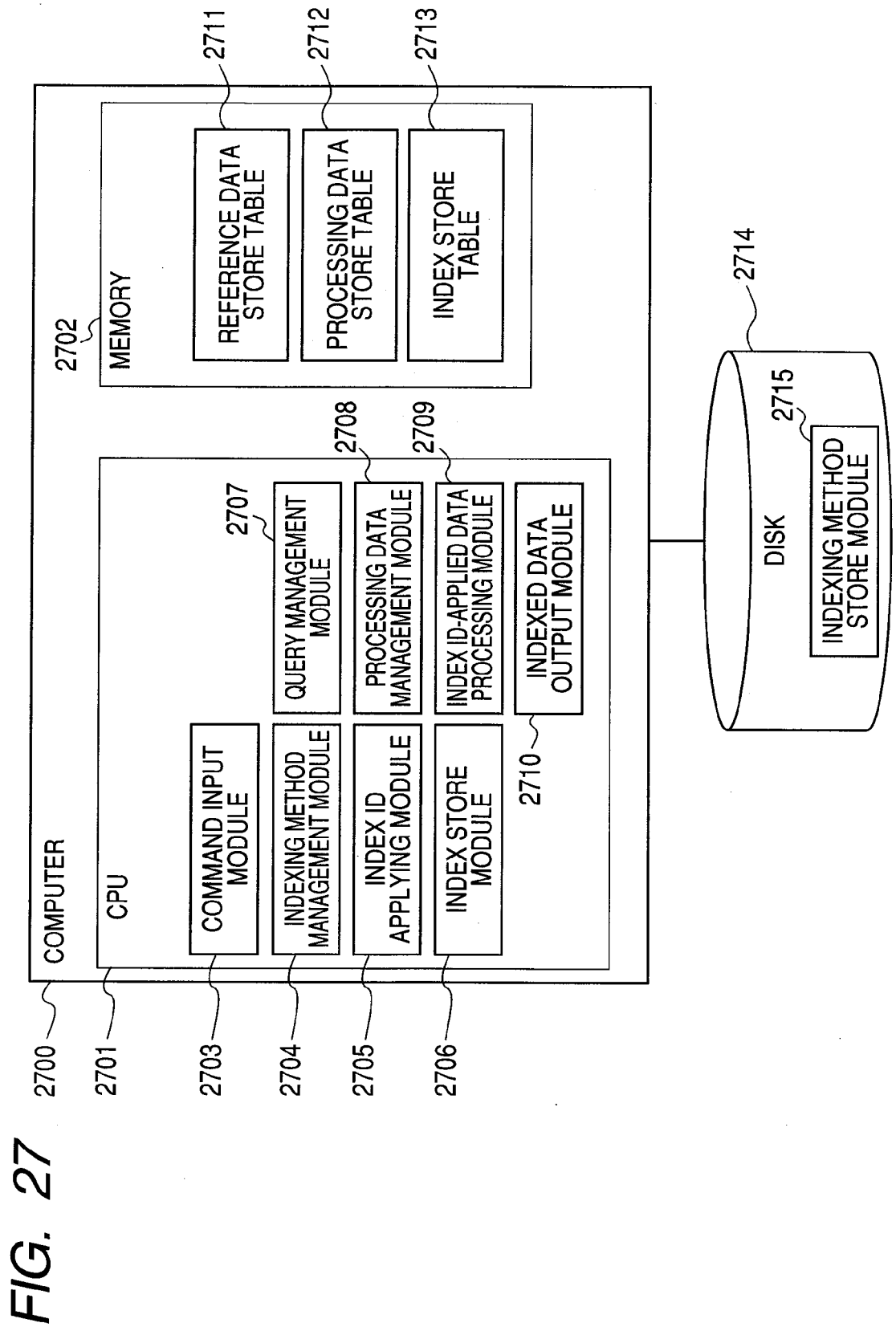
FIG. 27 is a block diagram showing system configuration in which components configuring the stream data processing system equivalent to the first embodiment are arranged in CPU, a memory and an external storage.

FIG. 1 is a block diagram showing an example of the configuration of a stream data processing system equivalent to a first embodiment of the invention, FIG. 2 is a flowchart showing an example of the processing by an index ID applying module provided to the stream data processing system shown in FIG. 1, FIG. 3 is a flowchart showing an example of processing following the processing shown in FIG. 2 by the index ID applying module, FIG. 4 is a flowchart showing an example of processing following the processing shown in FIG. 3 by the index ID applying module, FIG. 5 is a flowchart showing an example of processing by a processing data management module provided to the stream data processing system, FIG. 6 is a flowchart showing an example of processing by an index ID-applied data processing module provided to the stream data processing system, FIG. 7 is a flowchart showing an example of processing by an indexed data generating module and an index ID evaluating module respectively provided to the stream data processing system, FIG. 8 is a flowchart showing an example of processing following the processing shown in FIG. 7 by the indexed data generating module and the index ID evaluating module, FIG. 9 is a flowchart showing an example of processing by an index store module provided to the stream data processing system, FIG. 10 is an illustration schematically showing one example of a data format of stream data used for the stream data processing system shown in FIG. 1, FIG. 11 is an illustration showing a product position measurement stream including continuously input stream data, FIG. 12 is an illustration schematically showing an example of data stored in a reference data store management module provided to the stream data processing system shown in FIG. 1, FIG. 13 is an illustration showing one example of a query command about stream data, FIG. 14 is an illustration showing one example of an indexing method of input stream data, FIG. 15 is an illustration showing stream data with index ID generated by an index ID-applied data generating module provided to the stream data processing system shown in FIG. 1, FIG. 16 is an illustration showing data stored in an index store table provided to the stream data processing system shown in FIG. 1, FIG. 17 is an illustration showing an example of index ID-applied data output from the processing data management module, FIG. 18 is an illustration showing an example of index ID expression-applied processing result data output from the index ID-applied data processing module, FIG. 19 is an illustration showing an example of data output from an indexed data output module provided to the stream data processing system shown in FIG. 1 and an example of an index of the output data, and FIG. 20 is an illustration showing one example of application processing executed in a computer. FIG. 27 showing one example in which components configuring the stream data processing system are arranged in CPU, a memory and an external storage and are executed. The arrangement of the components is not limited to that shown in FIG. 27, for example, the components configuring the memory 2702 are generated in the external storage 2714, and their cache memory may be also realized in the memory 2702.

In the first embodiment, the indexed stream data processing system 100 receives information transmitted at real time from an RFID reader 101, a sensor node 102 or an application 104 executed in the computer 103 as stream data as shown in FIG. 1.

The indexed stream data processing system converts the stream data to significant information according to a command input by a user or by an application 110 executed in a computer 109, generates output data and an index of the output data, and executes stream data processing provided to the user or an application 107 executed in a computer 106.

The computer 109 is connected to the indexed stream data processing system 100 via a network 111. The network 111 may be also Ethernet (a registered trademark), a fiber distributed data interface (FDDI), a local area network (LAN) connected via an optical fiber and others or a wide area network (WAN) including the lower-speed Internet than LAN.

The indexed stream data processing system 100, the computer 103, the computer 106 and the computer 109 are configured by an arbitrary computer system such as a personal computer and a workstation, and the arbitrary computer system may be also the same computer and a different computer.

The applications 104, 107, 110 may be also the same application and a different application.

Further, stream data in this embodiment is different from a stream used for the distribution of an image and voice and one stream data corresponds to significant information.

Stream data received by the indexed stream data processing system 100 from the RFID reader 101, the sensor node 102 or the application 104 executed in the computer 103 is a series of continuous or intermittent data tuples.

A time stamp may be also applied by the RFID reader 101, the sensor node 102 or the application 104 executed in the computer 103 or by a component except the RFID reader 101, the sensor node 102 or the application 104 executed in the computer 103 before stream data is input to the indexed stream data processing system 100.

The indexed stream data processing system 100 is operated in CPU 2701 of a computer 2700 in which the indexed stream data processing system 100 is executed and includes a command input module 119, a query management module 118, an indexing method management module 120, the index ID applying module 130, the processing data management module 140, the index ID-applied data processing module 150, the indexed data output module 160 and the index store module 170.

The command input module 119 that functions as input means is similarly operated in the CPU 2701 of the computer 2700 in which the indexed stream data processing system 100 is executed and accepts a command and others input by a user or the application 104 executed in the computer. A command input method may be also a command line interface (CLI) format and a graphical user interface (GUI) format.

When the command is a command related to an indexing method, the command is output to the indexing method management module 120. When the command is a command related to a query about stream data, the command is output to the query management module 118.

The query management module 118 is similarly operated in the CPU 2701 and generates one or plural processing data management modules 140 and one or plural index ID-applied data processing modules 150 according to a query received from the command input module 119.

The indexing method management module 120 is similarly operated in the CPU 2701, selects a stored indexing method (stored index computation algorithm) according to a command received from the command input module 119, and notifies the index ID applying module 130 of it. A new indexing method can be registered.

The index ID applying module 130 is similarly operated in the CPU 2701, computes an index to be a first index of stream data, which is rating an incoming data tuple according to the indexing method notified from the indexing method management module 120, generates an index ID, and outputs a set of the index, the index ID and time at which the index is computed to the index store module 170. The index ID applying module outputs an index ID-applied stream data tuple which is a pair of the index ID and stream data tuple to the processing data management module 140.

The processing data management module 140 is similarly operated in the CPU 2701, receives the index ID-applied stream data from the index ID applying module 130, and holds it. The processing data management module selects index ID-applied data which is a processing object out of held one or plural index ID-applied stream data according to a determining method specified when the processing data management module 140 is generated by the query management module 118 and outputs the index ID-applied data to the index ID-applied data processing module 150.

When index ID-applied stream data eliminated from processing objects is included in the held index ID-applied stream data, the index ID-applied stream data is deleted and simultaneously, the index ID and time at which the index ID-applied stream data is judged eliminated from the processing objects are notified the index store module 170.

The index ID-applied data processing module 150 is similarly operated in the CPU 2701, receives the index ID-applied data from the processing data management module 140, generates index ID expression-applied processing result data which is a set of one or more index IDs, an index ID expression described by zero or more operators and processing result data based upon the index ID-applied data according to a method specified when the index ID-applied data processing module 150 is generated by the query management module 118, and outputs it to the indexed data output module 160.

The indexed data output module 160 is similarly operated in the CPU 2701, receives the index ID expression-applied processing result data from the index ID-applied data processing module 150, receives an index corresponding to index ID included in the index ID expression-applied processing result data from the index store module 170, computes an index corresponding to an index ID expression of the index ID expression-applied processing result data using the index, and outputs output data which is a data division of the index ID expression-applied processing result data and an index which is a second index of the output data to the user or the application 107 executed in the computer 106.

The index store module 170 receives a set of the index, the index ID and time at which the index is computed from the index ID applying module 130 and stores the set. Besides, the index store module receives the index ID and time at which index ID-applied stream data including the index ID is eliminated from the processing objects from the processing data management module 140 and records them.

Besides, the index store module receives the index ID and the time from the indexed data output module 160, returns an index at the time of the index ID, determines index ID not required to be held, and deletes data related to the index ID.

The configuration of the indexed stream data processing system 100 will be described in detail below.

The indexing method management module 120 includes an indexing method selecting module 121, an indexing method input module 122 and an indexing method store module 123 and receives a command input from a user or the application 110 executed in the computer 109 via the command input module 119.

When the command input from the command input module 119 is a command related to the registration of a user defined indexing method which is an indexing method uniquely defined by the user, the indexing method input module 122 outputs the user defined indexing method to the indexing method store module 123 and the indexing method store module 123 stores the user defined indexing method.

When the command input from the command input module 119 is a command related to the selection of an indexing method, one is selected out of zero or more indexing methods registered in the indexing method store module 123 beforehand or one or plural indexing methods uniquely defined by the user and is notified an index computing module 132 and a reference data store management module 133.

The index ID applying module 130 includes an index ID-applied data generating module 131, the index computing module 132, the reference data store management module 133 and a reference data store table 134.

It is desirable that the reference data store table 134 is generated in a high-speed random access storage such as a memory; however, it may be also generated in another storage such as a disk. In that case, access may be also sped up using a cache memory and others.

Referring to FIGS. 2, 3 and 4, processing by the index ID applying module 130 will be described below.

First, the index ID applying module 130 receives stream data, generates index ID in the index ID-applied data generating module 131 (a step S1302), and passes the stream data to the reference data store management module 133 together with the generated index ID (a step S1303).

The reference data store management module 133 stores the stream data in the reference data store table 134 together with the index ID (a step S1503). The index ID-applied data generating module 131 passes the index ID to the index computing module 132 (a step S1304).

Next, the index computing module 132 inquires the reference data store management module 133 of a data set required for index computing according to an indexing method specified by the indexing method management module 120 (a step S1402) and the reference data store management module 133 returns the required data set.

The reference data store management module 133 reads data by one row from the reference data store table 134 (a step S1505) and determines whether the read row is required for index computing or not (a step S1506).

When the read row is required in the processing in the step S1506, the data on the read row is added to the data set (a step S1508) and when the read row is not required, the row is deleted from the reference data store table 134 (a step S1507).

The reference data store management module 133 executes the processing in the steps S1505 to S1508 by all rows of the reference data store table 134 (a step S1509).

The index computing module 132 computes an index of each element of the acquired data set according to the indexing method (a step S1403) and stores the indexes in the index store module 170 (a step S1404).

The index computing module 132 executes the processing in the steps S1403 and S1404 for all elements of the data set (a step S1405). The index computing module 132 outputs the computed indexes of data and the number of the processing data management modules 140 which are destinations of output to an index store management module 171 (a step S1305).

An index may be computed every time a data tuple of the stream is input and also at time except it. The index ID-applied data generating module 131 outputs index ID-applied stream data which is a pair of stream data and index ID to one or plural processing data management modules 140 as shown in FIG. 2 (a step S1306).

The processing data management module 140 includes a processing data store management module 141 and a processing data store table 142.

Referring to FIG. 5, processing by the processing data management module 140 will be described below.

The processing data store management module 141 receives the index ID-applied stream data from the index ID applying module 130 and stores it in the processing data store table 142 (a step S1602).

The processing data store management module selects index ID-applied data which is a processing object from the processing data store table 142 according to a determining method specified when the processing data management module 140 is generated by the query management module 118 and outputs the selected index ID-applied data to the index ID-applied data processing module 150 (a step S1603).

The processing data store management module 141 deletes the corresponding index ID-applied stream data from the processing data store table 142 when the index ID-applied stream data eliminated from a processing object is judged existing in the processing data store table 142 by the determining method (a step S1604) and simultaneously, notifies the index store module 170 of index ID of the index ID-applied stream data and time at which the index ID-applied stream data is judged eliminated from a processing object (a step S1605).

The index ID-applied data processing module 150 includes a data processing module 151 and an index ID processing module 152.

Referring to FIG. 6, processing by the index ID-applied data processing module 150 will be described below.

The index ID-applied data processing module 150 receives the index ID-applied data from the processing data management module 140, generates output data based upon a data division of the index ID-applied data in the data processing module 151 according to a method specified when the index ID-applied data processing module 150 is generated by the query management module 118 (a step S1702), generates an index ID expression described with one or more index IDs and zero or more operators based upon index ID of the index ID-applied data in the index ID processing module 152 (a step S1703), generates index ID expression-applied processing result data which is a pair of the output data and the index ID expression, and outputs the data to the indexed data output module 160 (a step S1704).

The indexed data output module 160 includes an indexed data generating module 161 and an index ID evaluating module 162.

Referring to FIGS. 7 and 8, processing by the indexed data generating module 161 and the index ID evaluating module 162 will be described below.

The indexed data generating module 161 receives the index ID expression-applied processing result data from the index ID-applied data processing module 150 and passes received time of the index ID expression-applied processing result data and the index ID expression included in the index ID expression-applied processing result data to the index ID evaluating module 162 (a step S1802).

The index ID evaluating module 162 generates a set of index IDs included in the index ID expression (a step S1902) and inquires the index store module 170 of the corresponding indexes for each element of the set of index IDs (a step S1903).

The index ID evaluating module 162 executes the processing in the step S1903 for all elements of the set of index IDs (a step S1904). The index ID evaluating module computes an index corresponding to the index ID expression in the index ID expression-applied processing result data using the acquired indexes and outputs it to the indexed data generating module 161 (a step S1905).

The indexed data generating module 161 outputs data equivalent to the data division of the index ID expression-applied processing result data and the index of the output data which is the index received from the index ID evaluating module 162 to a user or the application 107 executed in the computer 106 (a step S1803).

The index store module 170 includes the index store management module 171 and an index store table 172. It is desirable that the index store table 172 is generated in a high-speed random access storage such as a memory; however, it may be also generated in another storage such as a disk. In that case, access may be also sped up using a cache memory and others.

Referring to FIG. 9, processing by the index store module 170 will be described below.

The index store management module 171 receives the index ID, the index, the index computed time and the number of processing data instances which is the number of the processing data management modules 140 to which the index ID-applied stream data is to be output from the index ID-applied data generating module 131 and stores them in the index store table 172 (a step S2003).

The index store management module also receives the index ID and time at which the index ID-applied stream data having the index ID is eliminated from a processing object from the processing data store table 142, retrieves a row of index IDs in the index store table 172 (a step S2005), and holds the time in the index store table 172 as time at which the processing data instance becomes void (a step S2007) when the number of the processing data instances is 1 (a step S2006).

When the number of processing data instances is not 1 (a step S2006), the number of processing data instances is decremented by 1 (a step S2008). The index store management module retrieves an index at the time of the index ID based upon the index ID and the time respectively received from the index ID evaluating module 162 and returns the index (a step S2010).

The index store management module deletes the corresponding index ID from the index store table 172 because the corresponding index ID is not referred subsequently when the index store table 172 includes the index ID the processing data instance voidance time of which precedes the time received from the index ID evaluating module 162 (a step S2011). The processing in the step S2011 may be also executed every time time is received from the index ID evaluating module 162 and at the other time.

FIG. 10 schematically shows an example of a suitable data format of input stream data shown in FIG. 1.

Stream data complies with a record format, a time stamp 201, product ID 202 and a product position 203 respectively configuring a record are equivalent to a segment, and a combination of the time stamp 201, the product ID 202 and the product position 203 is equivalent to a tuple.

FIG. 10 shows an example of position measurement data of a product in a smart shelf system, the product to which an RFID tag is added is exhibited on a smart shelf on which an RFID reader is installed, the RFID tag is read at an interval of one second using the RFID reader, and as a result, when the RFID reader reads the RFID tag, the product having the RFID tag is judged existing on the shelf.

When the RFID reader does not read the RFID tag, the RFID tag is judged existing out of the shelf, and time 201 at which the RFID reader reads the RFID tag, product ID 202 of the product to which the RFID tag is added and the determined product position 203 are output.

FIG. 11 shows a product position measurement stream 310 including continuously input stream data.

FIG. 11 shows that on a row 301 for example, a value of a time stamp is "10: 00' 02", product ID is "product 1" and a product position is "inside shelf".

In this embodiment, the time stamp is represented in the order of an hour, a minute and a second like "10: 00' 02", however, the time stamp may be also represented in another format represented by a format including a date like "2007/3/3 10: 00' 02 JST". It is similar in the following drawings.

FIG. 12 schematically shows an example of data stored in the reference data store management module 133.

In this case, the time at which the RFID reader reads the RFID tag 201, the product ID 202 of a product to which the RFID tag is added and the product position 203 determined according to the above-mentioned method respectively included in stream data are stored in columns 1001, 1002 and 1003 and the index IDs generated in the index ID-applied data generating module 131 are stored in a column 1004.

FIG. 13 shows one example of a query command about stream data. A format of the query command may be also the format shown in FIG. 13 and the other format.

The query command 1101 is transmitted from a user or the application 110 executed in the computer 109 to the query management module 118 via the command input module 119. The query management module 118 generates the processing data management module 140 that realizes the query command 1101 and the index ID-applied data processing module 150.

The query command 1101 means a query that demands product ID of a taken product from the product position measurement stream 310 (FIG. 11). That is, the query command means a query that demands the output (SELECT S. product) of product ID which has the same product ID (S1. product=S2. product) as the product position measurement stream 310, the current (S[now] as S1) position of which is outside the shelf (S1. position=outside shelf) and the position at the preceding time of which is inside the shelf (S[rows 2] as S2, S2. position=inside shelf).

Next, processing for executing the query will be described.

FIG. 14 shows one example of an indexing method of input stream data to be the algorithm of an index function.

In the indexing method in this embodiment, when the same time series data continues, the reliability of the data is set to be high and when when different data continues, the reliability of the data is set to be low.

In FIG. 14, $d_{i-1}$, $d_i$, and $d_{i+1}$ are data stored in the reference data store table 134. "$d_i$" is data of an object the index of which is computed, and $d_{i-1}$ and $d_{i+1}$ are data before and after $d_i$.

When data before or after $d_i$ is not an object the index of which is computed, $d_{i-1}$ is null or $d_{i+1}$ is null. As $d_i$ is data of an object of the indexing method, $d_i$ is not null.

According to the indexing method shown in FIG. 14, when the data before and after $d_i$ are both objects of the indexing method, the reliability of $d_i$ is 1.0 if $d_i$ is the same as the data before and after $d_i$, if $d_i$ is the same as either of the data before and after $d_i$, the reliability of $d_i$ is 0.7, and if $d_i$ is different from the data before and after $d_i$, the reliability of $d_i$ is 0.3.

When the data after $d_i$ is not the object of the indexing method though the data before $d_i$ is the object of the indexing method, the reliability of $d_i$ is 1.0 if $d_i$ is the same as the data before $d_i$ and if $d_i$ is different from the data before $d_i$, the reliability of $d_i$ is 0.5.

When the data before $d_i$ is not the object of the indexing method and the data after $d_i$ is the object of the indexing method, the reliability of $d_i$ is the same as the reliability of $d_i$ computed at the preceding time. When the data before and after $d_i$ are both not the object of the indexing method ($d_{i-1}$=null and $d_{i+1}$=null), the reliability of $d_i$ is 0.5.

FIG. 15 shows an index ID-applied stream data generated in the index ID-applied data generating module 131.

The time stamp 201, the product ID 202 and the product position 203 respectively shown in FIG. 10 correspond to a time stamp 501, product ID 502 and a product position 503 and in addition, index ID 504 is applied.

FIG. 16 shows data stored in the index store table 172. Data 610 which is a pair of time at which an index is computed 602 and an index 603 is stored every index ID 601.

For example, in a field of index ID "p1", it is stored that an index at the time of "10: 00' 02" is 1.0. At the time shown in FIG. 16, index ID "p2" is left in one processing data management module 140, index ID "p3" is left in the other two processing data management modules 140, and the index ID "p1" is eliminated from all processing data management modules 140 at the time of "10: 00' 04".

FIG. 17 shows an example of index ID-applied data output from the processing data management module 140.

A table 701 shows an example of index ID-applied data output from one processing data management module 140 and a table 710 shows an example of index ID-applied data output from the other one processing data management module 140.

FIG. 18 shows an example of index ID expression-applied processing result data output from the index ID-applied data processing module 150.

The index ID expression-applied processing result data is configured by a time stamp 801 which is a data division, product ID 802 and an index ID part 803. As for the index ID part 803, index ID-applied data 702, 703 out of index ID-applied data 701, 702, 703 input to the index ID-applied data processing module are generated based upon the index ID part 803.

In this embodiment, the index ID part 803 includes minimum values of the index ID-applied data 702, 703; however, they may be also determined by another method.

FIG. 19 shows an example 810 of data output from the indexed data output module 160 and an example 803 of an index of the output data.

A value of the index ID part 803 in the example of the index ID expression-applied processing result data shown in FIG. 18 is computed using the index stored in the index store module 170, 0.5 is acquired, and it is output as the index of the output data.

FIG. 20 shows one example of processing by the application 107 executed in the computer 106.

When the output data shown in FIG. 19 and the index of the output data are received, the retrieval of product information is executed because reliability that a product is taken out of the shelf is 0.5. When reliability that the product is taken out of the shelf is 0.6, product information is displayed.

The takeout information of a product and its final reliability are stored and afterward, analysis is made using stored takeout information and their reliability. For example, a takeout frequency of a product is totalized, when a popular product frequently taken out of the shelf is extracted, only data having high reliability such as 0.8 or higher is analyzed as a takeout event and a product frequently taken out of the shelf is extracted. When an unpopular product hardly taken out of the shelf is extracted, data the reliability of which is 0.1 or lower for example is regarded as not a takeout event and is analyzed.

As described above, the reliability of an input stream is computed and the input stream can be processing according to a query registered by a user beforehand.

Thereby, according to this embodiment, as the reliability of an input stream is evaluated again based upon input stream data that varies every moment and can be utilized for the reliability of a result of output, data processing in which real time and reliability are compatible is enabled.

Second Embodiment

In the first embodiment, as shown in FIG. 1, one index ID-applied stream data is output to one or plural processing data management modules 140, however, in a second embodiment, one index ID-applied stream data is output to only one processing data management module 140.

In the second embodiment, the configuration except the respective configuration of an index ID-applied data generating module 131, an index store management module 171 and an index store table 172 is similar to the configuration shown in FIG. 1 in the first embodiment.

In the first embodiment, in the index store module 170, to determine whether each index ID is required to be held in the index store table 172 or not, the number of index ID-applied stream data instances is stored in the index store table 172, however, in the second embodiment, the number of index ID-applied stream data instances is not stored.

An index ID applying module 130 receives stream data, generates index ID in an index ID-applied data generating module 131, and passes the stream data to a reference data store management module 133 together with the generated index ID.

The reference data store management module 133 stores the stream data together with the index ID in a reference data store table 134. The index ID-applied data generating module 131 passes the index ID to an index computing module 132.

The index computing module 132 extracts a data set required for computing an index from the reference data store management module 133 according to an indexing method specified by an indexing method management module 120, computes indexes of respective data included in the data set according to the indexing method, and outputs them to an index store module 170.

Data not required for computing an index according to the indexing method in the reference data store table 134 is deleted by the reference data store management module 133. An index may be also computed every time stream data is input and at the other time.

The index ID-applied data generating module 131 outputs index ID-applied stream data which is a pair of stream data and index ID to one processing data management module 140.

The index store management module 171 receives the index ID, the index and time at which the index is computed from the index ID-applied data generating module 131 and stores them in the index store table 172. The index store management module also receives index ID and time at which index ID-applied stream data having the index ID is eliminated from an processing object from a processing data store table 142 and holds the time as processing data instance voidance time in the index store table 172. The index store management module also retrieves an index at the time of the index ID based upon index ID and time respectively received from an index ID evaluating module 162 and returns the index.

As the corresponding index ID is not referred subsequently when the index store table 172 includes the index ID the processing data instance voidance time of which precedes time received from the index ID evaluating module 162, the index ID is deleted from the index store table 172. This processing may be also executed every time the time is received from the index ID evaluating module 162 and at the other time.

Thereby, according to the second embodiment, in such a query that one stream is input to only one processing data management module, the quantity of processing required for data management in the index store module 170 can be reduced.

Third Embodiment

Figure 21:
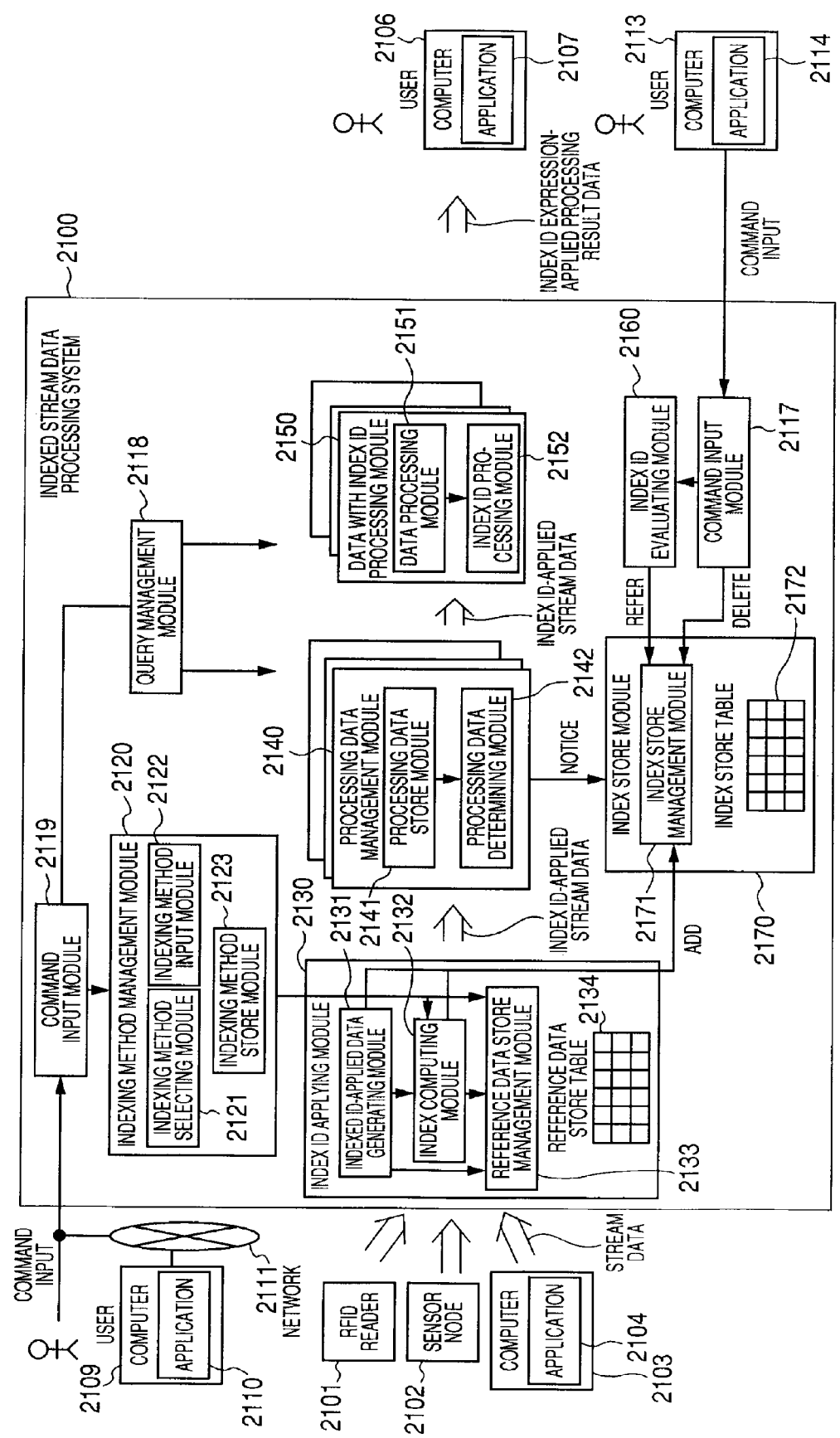
FIG. 21 is a block diagram showing an example of the configuration of an indexed stream data processing system equivalent to a third embodiment of the invention.

FIG. 21 is a block diagram showing an example of the configuration of an indexed stream data processing system equivalent to a third embodiment of the invention.

In the third embodiment, an index ID expression is output in place of an index of the result of processing. A component that accepts a command for acquiring an index based upon the output index ID expression is included and when the command for acquiring the index is input, an index of the index ID expression is computed.

FIG. 21 is the block diagram showing the configuration of the indexed stream data processing system equivalent to the third embodiment and its related system.

As shown in FIG. 21, the indexed stream data processing system 2100 includes a computer or a server for example. The indexed stream data processing system 2100 receives information transmitted at real time from an RFID reader 2101, a sensor node 2102 or an application 2104 executed in a computer 2103 as stream data, converts the stream data to significant information according to a command input from an application 2110, and generates index ID-applied processing result data which is the result of processing.

The indexed stream data processing system provides the index ID-applied processing result data to an application 2107 and executes stream data processing for outputting an index according to a command input from an application 2114.

The application 2110 is executed by a user or a computer 2109, the application 2107 is executed by a user or a computer 2106, and the application 2114 is executed by a user or a computer 2113.

In FIG. 21, components except the indexed stream data processing system 2100, the computer 2113 and the application 2114 are similar to those in the first and second embodiments. The computer 2113 and the application 2114 may be also the same as the computer 2106, the computer 2109, the application 2107 or the application 2110 and may be also different from them.

In the indexed stream data processing system 2100 shown in FIG. 21, components except an index ID evaluating module 2160 and a command input module 2117 are the same as those in the first and second embodiments.

The command input module 2117 accepts a command from the application 2114 executed in the computer 2113, outputs an instruction for evaluating an index ID expression specified in the command to the index ID evaluating module 2160 when the command is a command related to the evaluation of the index ID expression, receives an index of the result of evaluation from the index ID evaluating module 2160, and outputs it to the user or the application 2114 executed in the computer 2113. When the command is a command related to the deletion of index ID, the command input module outputs an instruction for deleting index ID specified in the command to an index store management module 2171.

The index ID evaluating module 2160 receives the instruction for evaluating the index ID expression from the command input module 2117, acquires an index corresponding to index ID included in the index ID expression from the index store management module 2171, computes an index corresponding to the index ID expression based upon the index, and outputs the computed index to the command input module 2117.

Thereby, in the third embodiment, the quantity of processing required for unnecessary conversion can be reduced by executing conversion from the index ID to the index at arbitrary time that requires conversion.

Fourth Embodiment

Figure 22:
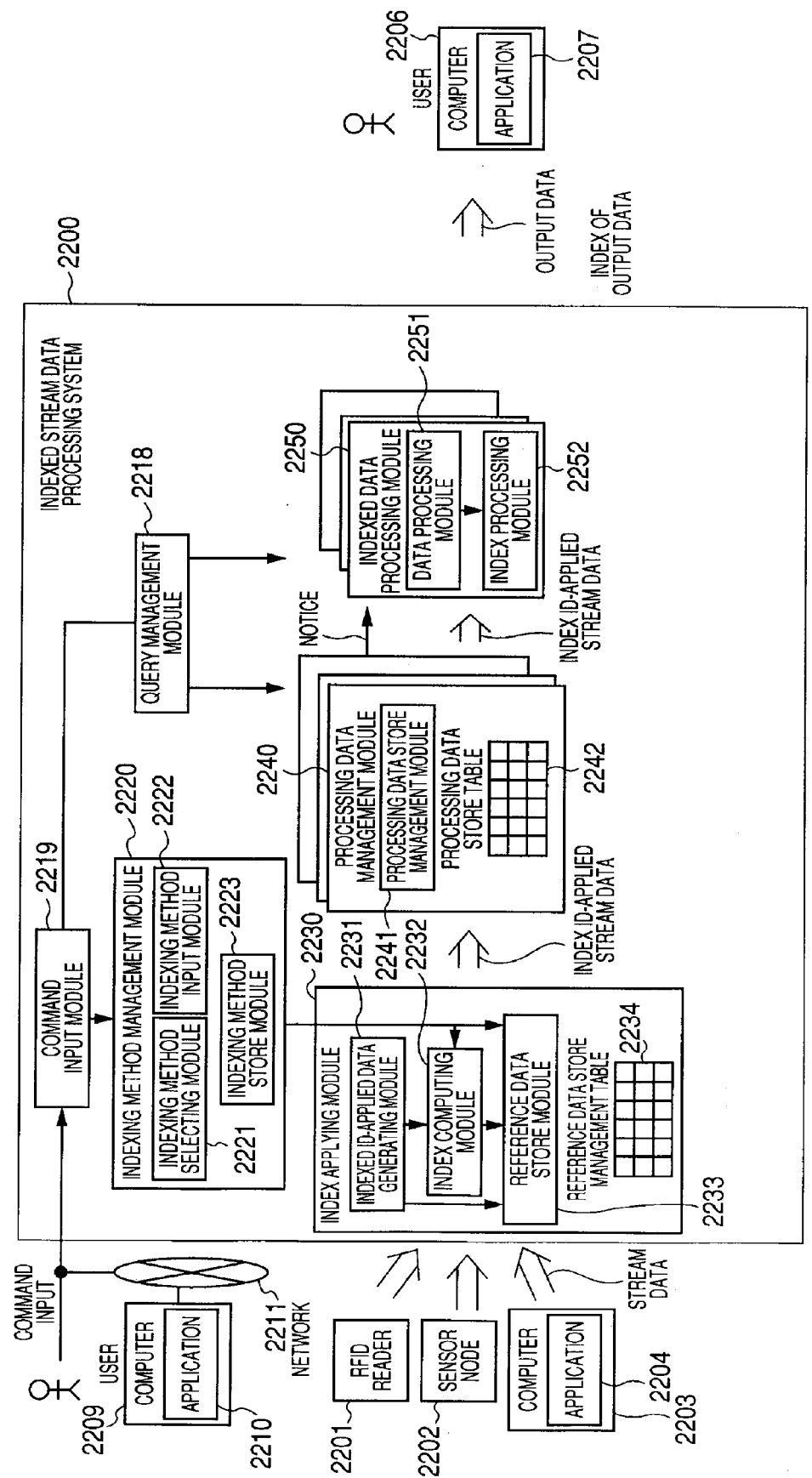
FIG. 22 is a block diagram showing an example of the configuration of an indexed stream data processing system equivalent to a fourth embodiment of the invention.

FIG. 22 is a block diagram showing an example of the configuration of an indexed stream data processing system equivalent to a fourth embodiment of the invention.

In the fourth embodiment, technique that handles a pair of stream data and an index without generating index ID will be described.

FIG. 22 is the block diagram showing the configuration of the indexed stream data processing system to which one embodiment of the invention is applied and a system related to it.

In FIG. 22, components except the indexed stream data processing system 2200 are similar to those in the first embodiment shown in FIG. 1.

The indexed stream data processing system 2200 includes a command input module 2219, a query management module 2218, an indexing method management module 2220, an index applying module 2230, a processing data management module 2240 and an indexed data processing module 2250.

The command input module 2219, the query management module 2218 and the indexing method management module 2220 are similar to the command input module 119, the query management module 118 and the indexing method management module 120 which are respectively the components in the first embodiment.

The index applying module 2230 includes an indexed data generating module 2231, an index computing module 2232, a reference data store management module 2230 and a reference data store table 2234.

The indexed data generating module 2231 receives stream data from an RFID reader 2201, a sensor node 2202 or an application 2204 executed in a computer 2203 and outputs the received stream data to the reference data store management module 2233.

The indexed data generating module also issues an instruction for computing an index to the index computing module 2232, receives the computed index and the stream data from the index computing module 2232, and outputs indexed stream data which is a pair of the index and the stream data to the processing data management module 2240.

The index computing module 2232 receives the instruction for computing the index from the indexed data generating module 2231, extracts data for computing an index from the reference data store management module 2233, computes an index of the data according to an indexing method specified by the indexing method management module 2220, and outputs the data and the index to the indexed data generating module.

The reference data store management module 2233 stores the stream data received from the indexed data generating module 2231 in the reference data store table 2234.

The processing data management module 2240 includes a processing data store management module 2241 and a processing data store table 2242. The processing data store management module 2241 receives the indexed stream data from the index applying module 2230, stores it in the processing data store table 2242, and outputs it to the indexed data processing module 2250 as indexed data.

When indexed stream data the stream data division of which is the same as that of the indexed stream data and the index of which is different is already stored in the processing data store table 2242, the processing data management module changes the index of the indexed stream data in the processing data store table 2242 to the index of the received indexed stream data.

Simultaneously, the processing data management module notifies the indexed data processing module 2250 that the index is changed. The processing data store management module 2241 deletes the indexed stream data eliminated from processing data from the processing data store table 2242 according to a method specified when the processing data management module 2240 is generated by the query management module 2218.

The indexed data processing module 2250 includes a data processing module 2251 and an index processing module 2252.

The indexed data processing module 2250 receives the indexed data from the processing data management module 2240, generates output data based upon a data division of the indexed data in the data processing module 2251 according to a method specified when the indexed data processing module 2250 is generated by the query management module 2218, generates an index of the output data based upon an index of the indexed data, and outputs the output data and the index of the output data to a user or an application 2207 executed in a computer 2206.

The indexed data processing module 2250 receives notice that the index is changed from the processing data management module 2240 and computes an index of the output data in consideration of the notice that the index is changed in the index processing module 2252.

Thereby, in the fourth embodiment, the configuration of the indexed stream data processing system 2200 can be simplified and the cost can be reduced.

Fifth Embodiment

Figure 23:
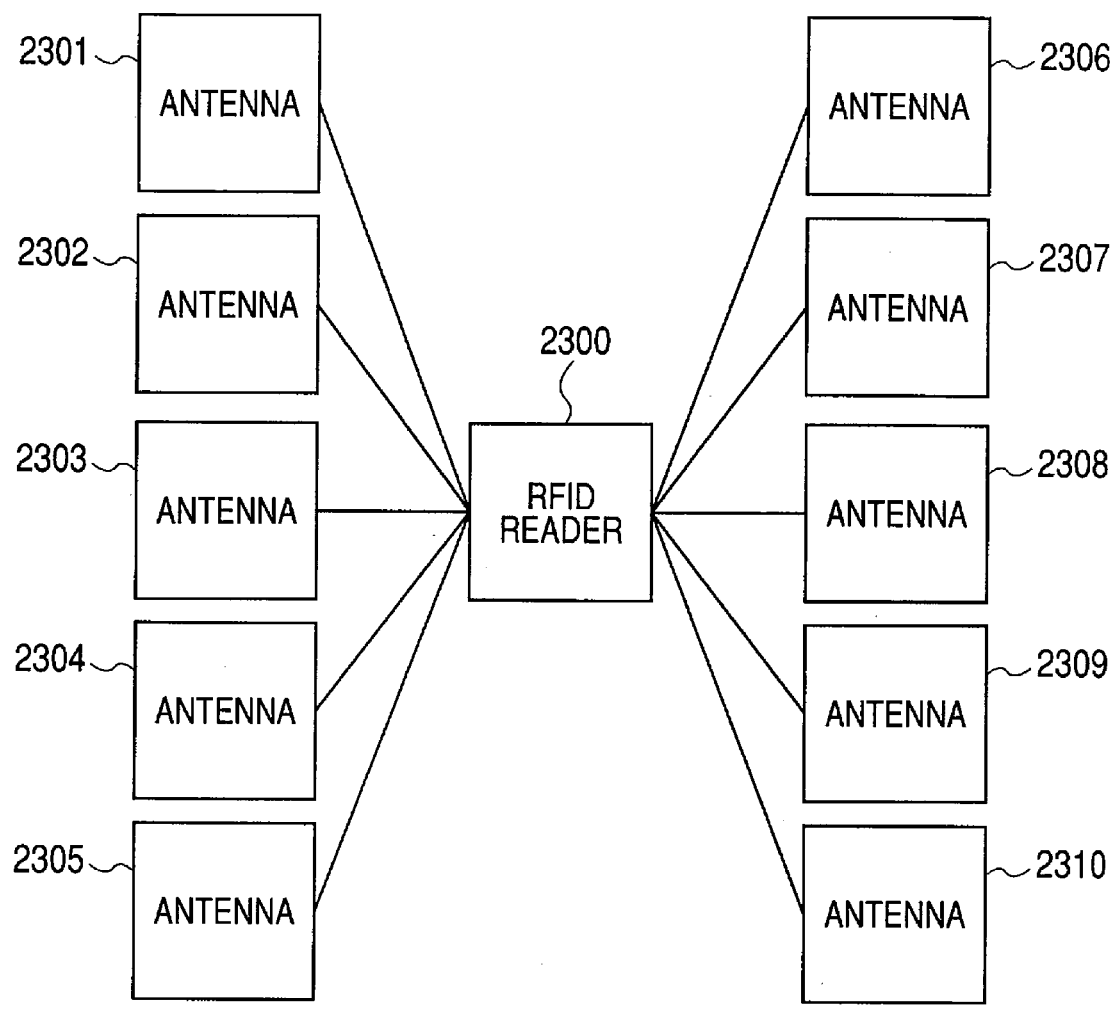
FIG. 23 is a block diagram showing an example of the configuration of an RFID reader equivalent to a fifth embodiment of the invention.

FIG. 23 is a block diagram showing an example of the configuration of an RFID reader equivalent to a fifth embodiment of the invention.

In the fifth embodiment, an example that the reliability of input stream data is acquired based upon plural measurement data is shown. In this embodiment, components of the system are similar to those in the first embodiment: however, the components may be also similar to those of any of the first to fourth embodiments.

FIG. 23 shows an example of the configuration of the RFID reader 2300.

For example, ten antennas 2301 to 2310 are connected to the RFID reader 2300. The antennas 2301 to 2310 are arranged so that each RFID from each RFID reader provided on a shelf for example is read by at least one antenna.

An RFID tag can be prevented from being unread by the antennas 2301 to 2310 arranged as described above. The RFID tag can be prevented from being unread at a lower price than a price when the number of the RFID readers is increased by increasing the number of the lower-priced antennas than the RFID reader like the configuration shown in FIG. 23. In this embodiment, ten antennas are provided, however, an antenna or antennas of an arbitrary number equal to or exceeding one may be provided.

The RFID reader 2300 switches the antennas 2301 to 2310 at an interval of 0.1 second in the order, reads the RFID tag, and transmits the read information of the RFID tag to the indexed stream data processing system 100 shown in FIG. 1 in the read order as stream data.

For example, the information of the RFID tag read by the antennas 2301, 2302, 2303 appear three times in the stream data. The index computing module 132 computes the reliability of read data of the RFID tag read by at least one antenna out of the antennas 2301 to 2310 according to a method described later.

When the more antennas read the RFID tag, the reliability of the read data increases and when the fewer antennas read the RFID tag, the reliability decreases. For example, as fluctuation may occur when the RFID tag is read by only the antenna 2301, the reliability is judged as 0.5 and when the RFID tag is read by the two antennas 2301 and 2310, the reliability is judged as 1.0.

As the RFID reader 2300 switches the antennas 2301 to 2310 at an interval of 0.1 second for example and performs reading, time at which the RFID tag is read by the antenna 2310 is delayed by approximately 1.0 second from time at which the RFID tag is read by the antenna 2301.

Therefore, when the read reliability of the RFID tag is computed according to the method of computing reliability, the reliability is first 0.5 when the RFID tag is read by the antenna 2301 and the reliability is 1.0 when the RFID tag is read by the antenna 2310 after approximately 1.0 second.

When it is supposed that approximately one second is required for retrieving product information in the application shown in FIG. 20, the product information is displayed in approximately one second since the time at which the RFID tag is read by the antenna 2301.

In the case of a system that product information is retrieved and displayed since it is clarified that the RFID tag is read by two or more antennas out of the antennas 2301 to 2310 for example without utilizing the invention, approximately 2.0 second is required since time at which the RFID tag is read by the antenna 2301 to display product information.

Thereby, in the fifth embodiment, the reliability of data can be acquired based upon plural measurement data.

Sixth Embodiment

Figure 24:
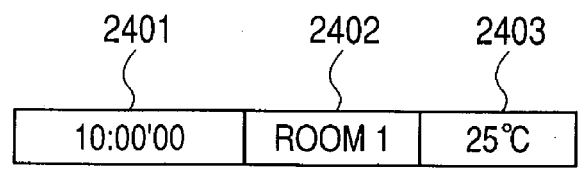
FIG. 24 is an illustration schematically showing an example of a suitable format of stream data input from a sensor node in the fifth embodiment of the invention.

FIG. 24 is an illustration schematically showing an example of a suitable format of stream data input from the sensor node in the fifth embodiment of the invention, FIG. 25 is an illustration showing an example of a query about the input stream data shown in FIG. 24, and FIG. 26 is an illustration showing one example of an application that receives the result of the query shown in FIG. 25 and its reliability and executes processing.

In a sixth embodiment, an example of a method of computing the reliability of data input from the sensor node will be described. In the sixth embodiment, components of a system are similar to those in the first embodiment; however, the components may be also similar to those in any of the first to fourth embodiments. For the configuration of a related system, data shall be input from the sensor node 102 shown in FIG. 1.

The sensor node 102 continuously measures the temperature of a room for example every 10 seconds and transmits a pair of ID of the room and measured temperature to an indexed stream data processing system 100 as stream data. An interval of measurement may be also 10 seconds and the other.

FIG. 24 schematically shows the example of the suitable format of stream data input from the sensor node 102 and the format is configured by temperature measurement time 2401, room ID 2402 and the measured temperature of the room 2403.

An index computing module 132 computes the reliability of input stream according to a method described later. It is normally inconceivable that the temperature of the room rises by ten degrees for ten seconds, however, it may occur in the case of emergency such as the occurrence of fire.

In the meantime, it is inconceivable that the temperature of the room falls by ten degrees for ten seconds. Then, when the temperature rises by ten or more degrees for ten seconds, reliability is judged as 0.5 and when high temperature also continues afterward, reliability is judged as 0.9.

In the meantime, when the temperature of the room falls by ten or more degrees for ten seconds after it rises by ten or more degrees, reliability is lowered up to 0.1. In the sixth embodiment, the rise of temperature is set to ten degrees; however, the rise may be also a value except it.

FIG. 25 shows the example of a query about input stream data.

With the newest measured temperature every room (GROUP BY roomID) as an object (FROM S[now]), ID of a room the temperature of which is 40 or more degrees (WHERE S. temperature>40) is output (SELECT S. roomID).

FIG. 26 shows the example of the application that receives the result of the query shown in FIG. 25 and its reliability and executes processing.

When the temperature of the room exceeds 40 degrees and its reliability is 0.5, the situation is notified a guard to be an alert. When the temperature of the room exceeds forty degrees and its reliability is 0.9, a sprinkler is activated.

When fire occurs in the room, the sprinkler is activated and work for fighting fire is required, however, when a temperature sensor fails and no fire occurs, large loss is caused if the sprinkler is activated.

As described above, when it is possible that the temperature sensor fails, processing having smaller risk than the activation of the sprinkler such as notice to the guard can be selected.

Thereby, in the sixth embodiment, the reliability of multi-valued measurement data input from the sensor can be enhanced.

The invention made by these inventors has been concretely described based upon the embodiments, however, the invention is not limited to the embodiments and it need scarcely be said that the invention can be variously modified in a range which does not deviate from the object.

The invention is suitable for stream processing technique for receiving stream data from the RFID reader and the sensor, applying reliability to the result of the processing of the input data and outputting the stream data.

What is claimed is:

1. A stream data processing method for processing a stream which is a flow of time series data including plural data tuples to which each time stamp is applied and which are continuously incoming in the ascending order of time stamps, and for applying an index to each data tuple of the stream, said method comprising the steps of:

subsequent to an index-applying process for preceding data tuple, computing a first index rating an incoming data tuple of the stream, as an objective data tuple, according to index function algorithm utilizing the objective data tuple and the preceding data tuple of the stream in predetermined period of time;

associating the first index with the incoming data tuple;

processing the objective data tuple according to a registered query;

acquiring an interim index based upon the first index associated with the objective data tuple and a final index which is stored for the preceding data tuples;

outputting the processed data tuple and the acquired interim index as an index rating the processed data tuple;

at a moment when a following data tuple arrives, computing, by using at least the following data tuple, a second index rating said objective data tuple; and storing the second index associated with the objective data tuple as a final index rating the objective data tuple.

2. The stream data processing method according to claim 1, wherein the computed first index is stored in an index store module and the objective data tuple is associated with the stored first index by an index ID applied to the objective data tuple.

3. The stream data processing method according to claim 1, wherein:

the first and second indexes are reliability of each data tuple which is a probability showing the validity of each data tuple of the stream.

4. The stream data processing method according to claim 1, wherein:

the second index of the objective data tuple is computed utilizing the preceding data tuple, the objective data tuple and the following data tuple according to predefined index function algorithm.

5. The stream data processing method according to claim 1, wherein:

an index dependent processing that stream data according to reliability is executed based upon the result of the processing of the stream data and the second index.

6. A stream data processing system that processes a stream which is a flow of time series data including plural data tuples to which each time stamp is applied and which are incoming in the ascending order of time stamps according to an arbitrarily registered query, comprising:

a processor;

a memory;

an index ID applying module that computes an index rating an incoming data tuple as a first index, applies an index ID to the incoming data tuple, outputs index ID-applied stream data and computes an index rating said incoming data again as a second index, by using at least a following data tuple, at a moment when the following data tuple arrives;

an index store module that stores a set of the index ID, the computed first index and time at which the first index is computed and a set of the index ID, the second index computed again and time at which the second index is computed again;

a processing data management module that manages the index ID-applied stream data to be processed according to the registered query;

an index ID-applied data processing module that applies processing to the index ID-applied stream data to be processed at each time and outputs a result of the processing and an index ID expression describing an interim index rating the result of the processing by utilizing index ID applied to the data tuple to be processed and index ID applied to a preceding data tuple; and an indexed data output module that acquires the interim index by assigning indexes retrieved from said index store module in the index ID expression and outputs it together with the result of the processing.

7. The stream data processing system according to claim 6, comprising:

an input module that inputs index function algorithm for computing the index.

8. The stream data processing system according to claim 6, wherein:

the first and second indexes are reliability of each data tuple which is a probability showing the validity of each data tuple of the stream.

9. The stream data processing system according to claim 6, wherein:

the second index of the objective data tuple is computed utilizing the preceding data tuple, the objective data tuple and the following data tuple according to predefined index function algorithm.

\* \* \* \* \*